United States Patent
Takehara et al.

(10) Patent No.: US 6,768,931 B2
(45) Date of Patent: Jul. 27, 2004

(54) METHOD AND APPARATUS FOR QUAY CONTAINER CRANE-BASED AUTOMATED OPTICAL CONTAINER CODE RECOGNITION WITH POSITIONAL IDENTIFICATION

(75) Inventors: Toru Takehara, San Mateo, CA (US); Maxwell W. King, Byron, CA (US); Chingyei Chung, Hayward, CA (US)

(73) Assignee: PACECO Corp., Hayward, CA (US)

( * ) Notice: Subject to any disclaimer, the term of this patent is extended or adjusted under 35 U.S.C. 154(b) by 0 days.

(21) Appl. No.: 10/120,032

(22) Filed: Apr. 9, 2002

(65) Prior Publication Data

US 2003/0191557 A1 Oct. 9, 2003

Related U.S. Application Data

(63) Continuation-in-part of application No. PCT/US01/24458, filed on Aug. 2, 2001, which is a continuation of application No. 09/632,866, filed on Aug. 4, 2002, now Pat. No. 6,356,802.

(51) Int. Cl.[7] .................................................. G06F 7/00
(52) U.S. Cl. ................. 700/225; 414/140.3; 414/141.3; 414/142.6
(58) Field of Search ................................. 700/213, 225, 700/229, 259; 414/137.1, 139.4, 139.9, 140.3, 140.4, 141.3, 141.6, 142.6, 142.7

(56) References Cited

U.S. PATENT DOCUMENTS

| 4,281,342 | A | * | 7/1981 | Ueda et al. .................... 348/94 |
|---|---|---|---|---|
| 5,152,408 | A | * | 10/1992 | Tax et al. .................... 212/270 |
| 5,729,453 | A | * | 3/1998 | Lee et al. ....................... 701/50 |
| 5,760,415 | A | * | 6/1998 | Hauck et al. ........... 250/559.33 |
| 5,769,589 | A | * | 6/1998 | Lubbers ....................... 414/268 |
| 5,780,826 | A | * | 7/1998 | Hareyama et al. .......... 235/385 |
| 5,835,377 | A | * | 11/1998 | Bush ............................ 700/99 |
| 6,256,553 | B1 | * | 7/2001 | Erikkila ....................... 700/213 |
| 6,356,802 | B1 | * | 3/2002 | Takehara et al. ............ 700/215 |
| 6,577,921 | B1 | * | 6/2003 | Carson ........................ 700/214 |

FOREIGN PATENT DOCUMENTS

WO  WO 02/14202 A1   2/2002

* cited by examiner

Primary Examiner—Khoi H. Tran
(74) Attorney, Agent, or Firm—Gregory Smith & Associates; Earle Jennings

(57) ABSTRACT

A method and system for a quay container crane with container code recognition of a container identified by a container code with container positional identification is disclosed. The system and method are capable of performing these tasks without the use of non-standard container tagging.

60 Claims, 15 Drawing Sheets

METHOD AND APPARATUS FOR QUAY CONTAINER CRANE-BASED AUTOMATED OPTICAL CONTAINER CODE RECOGNITION WITH POSITIONAL IDENTIFICATION

CROSS REFERENCE TO RELATED APPLICATIONS

This application is a continuation-in-part of, and claims the priority date of, PCT/US01/24458, filed Aug. 2, 2001, entitled: A Method and Apparatus for Locating Cargo Containers, Applicant: PACECO Corp., which is a continuation of U.S. patent application, Ser. No. 09/632,866, filed Aug. 4, 2002, now issued as U.S. Pat. No. 6,356,802, entitled: Method and Apparatus for Locating Cargo Containers; Assignee: PACECO Corp., Inventors: Takehara and Ng.

TECHNICAL FIELD

This invention relates to automated container code recognition on quay container cranes as used in loading and unloading cargo containers from ships.

BACKGROUND ART

In the marine shipping industry, the expected annual container traffic growth is from 4.7% to 7.6%. Container terminals are faced with the challenge of maintaining the inventory control for these escalating numbers of containers. The input, ouput and storage of containers at these terminals must provide an efficiency level that is at least consistent with, or exceeds, past performance.

Present and future growth levels have compelled terminal management companies to look for new systems to bring about more efficient resource control and as a consequence, provide a more profitable operation.

Shipping companies wish to reduce the time a ship spends at port in order to increase the productivity of each vessel. Increasing the productivity of berthing operations allows ships to be loaded and unloaded faster, effectively reducing the time spent at port.

What is needed by both terminal management and shipping companies is a more accurate, real time accounting of incoming, outgoing and existing container inventory. A more efficient container inventory management system is needed to minimize the time spent at a port or rail yard loading and unloading containers.

FIG. 1 illustrates a typical berthing process involving operations of quay container cranes 2200, transports between quay container cranes 2200 and storage yards, and storage yard containers manipulated by transfer container cranes 2100, as found in the prior art.

The berthing operations involve the transport of containers between container ships and the storage yard. Currently, quay container cranes 2200 access the containers from above ships 220 and move them to and from transportation units 210, such as trucks, each with a chassis, or Automatically Guided Vehicles (AGV's). The vehicles deliver the containers to storage yards 200 where other vehicles transfer the containers to stacks. The berthing process involves three operations: (1) quay container crane 2200 handling, (2) quay container crane 2200 to storage area 200 transport, and (3) storage area 200 manipulation often by one or more transfer container cranes 2100 as illustrated in FIG. 1.

The quay container crane 2100 and transport vehicle 210 operations are highly interdependent. A delay in one operation causes the other to pause, reducing the overall productivity of the berthing process. If there are mistakes in these operations, then the overall berthing process is seriously delayed.

It is extremely important that ship unloading of containers be done correctly. If there are mistakes, a container may be lost for as much as a month. Even when found, the container may be further delayed because the ship, which has its own schedule, may already have left. This can render the cargo in a container worthless. For example, the container may hold seafood or other perishable products, which a delay of one or more months could render worthless.

What is needed is a method for reducing errors and supporting efficient operation of the berthing process.

FIGS. 2A and 2B illustrate typical container codes and their representation on the side of a container as found in the prior art.

Each cargo container 100 is assigned a unique identification number 110 displayed on the sides and roof of the container. This identification number is represented in the form of a painted code and ID tag. Numerous government agencies and ship regulators require container codes on all containers. As a result, the painted container code representations of numerals and letters are used universally and internationally, as shown in FIGS. 2A and 2B.

A magnetic tag is another prior art method assigning an identification number to a container. However, magnetic tag method suffers from several problems. The magnetic tag method is not an international standard. Magnetic tags for containers are only installed by individual shipping line owners at their discretion. Not all container transporters support magnetic tags for their containers.

Additionally, a magnetic tag must pass in close proximity to a magnetometer in order for the magnetic tag to be read. The container passing the magnetometer can be outbound and inbound. Moreover, the magnetically tagged container can be moved anywhere. Magnetic tag reading provides no information about the container's physical location.

Another prior art alternative can identify containers from a distance. It is a technically more sophisticated and expensive system requiring a transponder tag attached to each container. The transponder tags can be programmed to show different kinds of information in the form of a coded signal when interrogated by a radio frequency transceiver. Such systems are expensive, delicate, and easily damaged.

Cargo containers are the individually property of the different shipping lines. When used by a non-owner shipping line, a container rental fee is paid to the owner. At the present time, the shipping companies only know the size of each container and whether it is dry or refrigerated.

A cargo container can become lost for several reasons. Inadvertently, a container is misplaced in a different location (yard address). Sometimes a container crane operator leaves a container at the wrong address, causing the container to be lost. A computer tracking the containers parked in a container terminal storage area will have an error in the container's tracking data. As a result, the lost container is effectively invisible to the existing container terminal management system (CTMS). While this is usually discovered evetually, the container is inevitably lost for a certain time.

A cargo container can become lost when the container ID number is incorrectly input into the CTMS. A cargo container can become lost when the container ID number is unreadable due to dirt, scratches, being covered, or the incorrect label on the container.

Any of these errors can result in disruptions of the inventory database. In addition, these errors become particularly serious when one attempts to place a second container into a supposedly vacant location only to find the location is already occupied, which further results in time consuming interruptions. What is needed is an efficient way to track all the containers and update an inventory database.

It can take a week in a major container storage yard to find a lost container. This can delay a ship's departure and/or the container's delivery to its destination. Either and/or both delays cost the shipping companies money.

Today, there is a large turnover of cargo containers in the seaports. This cargo turnover makes it necessary to regularly update the CTMS database. What is needed is an automated method of updating the CTMS database in real-time that will work efficiently even during the rush hours.

Today, a known disclosure teaching automatic reading of container ID tags on container cranes, is found in U.S. Pat. No. 6,356,802 entitled "Method and apparatus for location cargo containers", by Takehara (one of the inventors of this application) and Ng. The '802 patent is assigned to the same assignee as this application, Paceco Corp. The '802 patent discloses "The system can be installed on cranes to identify containers at wharfside and on straddle carrier cranes for identifying containers in single or multiple stack container storage. The system can be installed on cranes to identify containers mounted on rail cars in rail terminals . . . " (Lines 50–55, Column 4)

"The machine reader, its associated apparatus, and the LDU, are carried onboard a transporter such as a cart which runs on tracks or can be steerable. The cart can either be operator driven or remotely controlled. The apparatus could be mounted onboard the storage yard patrol truck. . . . The machine reader can be alternatively aimed by the transporter, remotely controlled, or handheld by an operator." (lines 40–48, Column 6) Note that "LDU" is disclosed as "location determining unit" in line 1 of Column 6.

". . . the present invention contemplates wireless transmission of the data from the machine reader/transporter to the central terminal where the CTMS is located for real time data updating. This can be accomplished by a wireless modem, or a communication unit, which transmits the container's ID number and its current location back to the stationary central computer which hosts the CTMS program and also contains the inventory database." (line 65 Column 6-line 6 Column 7) CTMS refers to container terminal management system (line 12 Column 3).

"The identification means is scanned from a distance by a machine such as an optical character recognition (OCR) unit to interrogate the ID tag and identify the container. It is an important characteristic of the invention that an operator of the system is able to remotely interrogate an ID tag of a cargo container . . . without the necessity of physically approaching and contacting the container or even coming in close proximity thereto." (lines 3–10 Column 5)

While of value, the '802 patent fails to disclose or teach at least the following:
1. The monitoring in real-time of the berthing process, particularly the loading and unloading of containers from a ship. There are advantages to automatic monitoring of the exact sequence of cargo containers being loaded and unloaded from a ship. Knowing the exact sequence can reveal, and/or fix, ship loading errors, which can be quite costly.
2. Real-world optical character recognition systems occasionally make mistakes or are unable to recognize the characters, often requiring reliability estimates of the recognized container ID.
3. There is a practical requirement for an automatic container code reading machine to send a version of the image(s) captured by its video imaging device(s) to a remote operator. This again stems from the real-world limitations of optical character recognition systems at recognizing the characters.
4. There is a practical requirement for the machine to minimize bandwidth in sending the video image(s) across at least a wireless physical transport layer.
5. There are significant advantages in many real-world situations for the machine to have multiple video imaging devices placed apart from at least each other, rigidly affixed to the container crane. Such advantages include the ability to withstand the severe mechanical vibrations container cranes experience, while providing container code observations from various locations about and around the container crane, which include providing the length of the cargo container.
6. There are further advantages to positioning multiple, independently controlled lighting systems to improve the imaging quality of the multiple video imaging devices.
7. There are advantages to monitoring cargo container operations by a container crane either through sensing the control system of the container crane, or through the use of sensors external to the container crane's control system.

To summarize, what is needed by both terminal management and shipping companies is a more accurate, real time accounting of incoming, outgoing and existing container inventory as the container cranes act upon and around the containers. What is needed is a method of reducing errors and supporting efficient operation in the berthing process through the automated monitoring of cargo container loading and unloading.

What is needed is an automatic container code reading machine sending a version of the image(s) captured by its video imaging device(s) to the remote operator. The bandwidth needs to be minimized in sending video image(s) across at least a wireless physical transport layer. The machine needs, in many real-world situations, to include multiple video imaging devices placed apart from each other and rigidly affixed to the container crane. Multiple, independently controlled lighting systems may further be needed, positioned to improve the imaging quality of the multiple video imaging devices.

Note that the problems discussed herein also relate to rail yard container inventories as well.

SUMMARY OF THE INVENTION

The invention solves at least all the problems discussed above regarding the prior art.

The invention provides a method and system supporting container code recognition from a quay container crane 2200 communicating with a container inventory management system. An optical characteristic recognition system preferably tracks container movement from ship to shore and vice versa.

The invention can read the standard universal identification (ID) tags internationally used on containers. Container ID tags will be referred to hereafter as container codes. Container inventory management systems incorporating this invention can be integrated into existing container terminal management systems (CTMS). Since each cargo container carries a standard container code, the invention can be utilized for tracking of all containers with respect to their history, damage, current location, and use.

The invention supports operators remotely interrogating a container code without the need to physically approach the container. The optical characteristic system further provides at least one video image, which is compressed and may be sent via a wireless physical transport to the container inventory management system. The video image compression effectively minimizes the bandwidth required to send video images.

The invention preferably includes multiple video imaging devices preferably, mechanically coupled at distinct locations about the Quay container crane 2200. The invention further preferably includes multiple, independently controlled lighting sources. At least two of the multiple lighting sources are further mechanically coupled apart from each other on Quay container crane 2200 to provide length estimates of a cargo container.

The invention reduces container inventory errors, supports accurate shipping container plans, and increases the overall terminal efficiency.

Optical characteristic recognition systems are sometimes referred to as container code readers. Optical characteristic recognition systems may further interrogate the contents of a container.

These and other advantages of the invention will become apparent upon reading the following detailed descriptions and studying the various figures of the drawings.

DETAILED DESCRIPTION OF THE INVENTION

Figure 1:
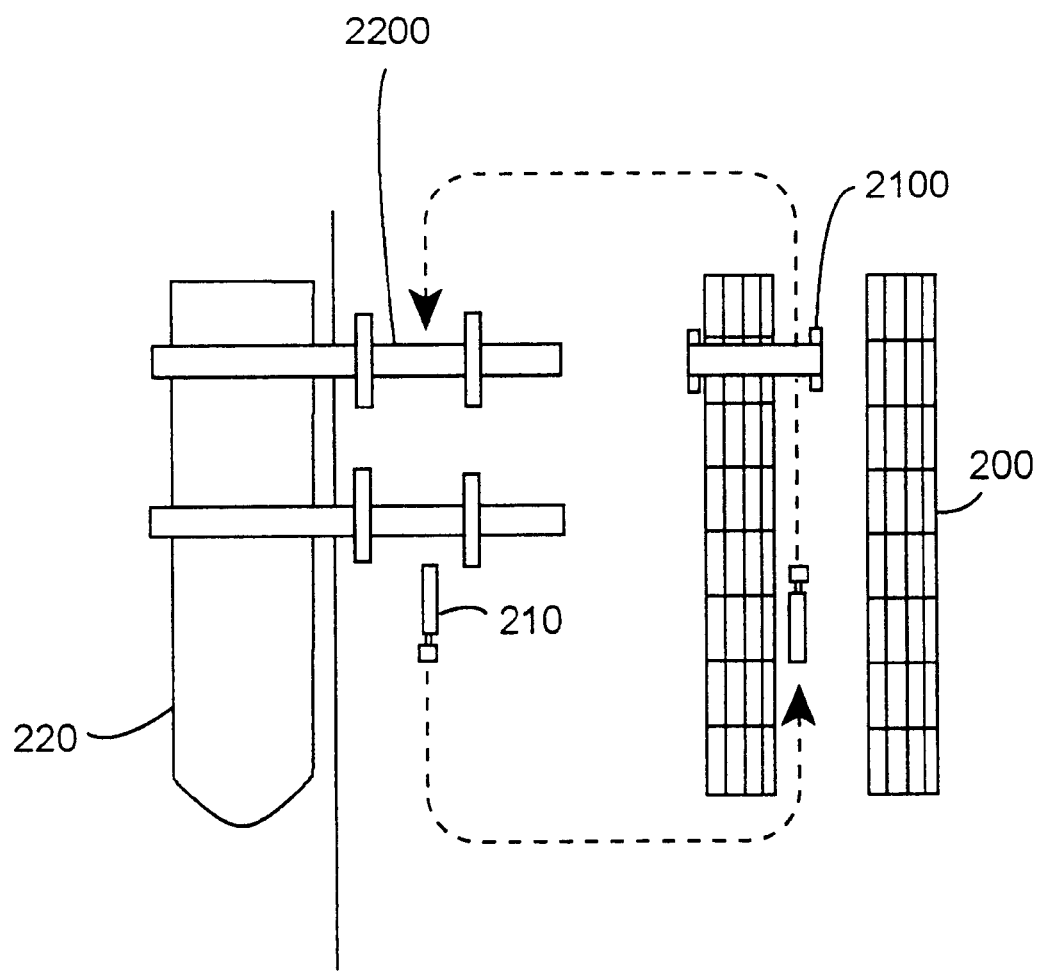
FIG. 1 illustrates a typical berthing process involving quay container cranes 2200, transports between quay container cranes 2200 and storage yards, and storage yard containers manipulated by transfer container cranes 2100, as found in the prior art.

The invention provides a method and system supporting container code recognition of a container, from a quay container crane 2200 as shown in FIG. 1, to manage at least a container inventory. The invention automatically and efficiently tracks the location of the container in loading and unloading ships, automatically updating at least the container inventory database.

The invention supports remotely interrogating a container for identification. And automatic monitoring of the berthing process, by real-time monitoring of the loading and unloading of containers from ship 220 shown in FIG. 1.

Figure 3:
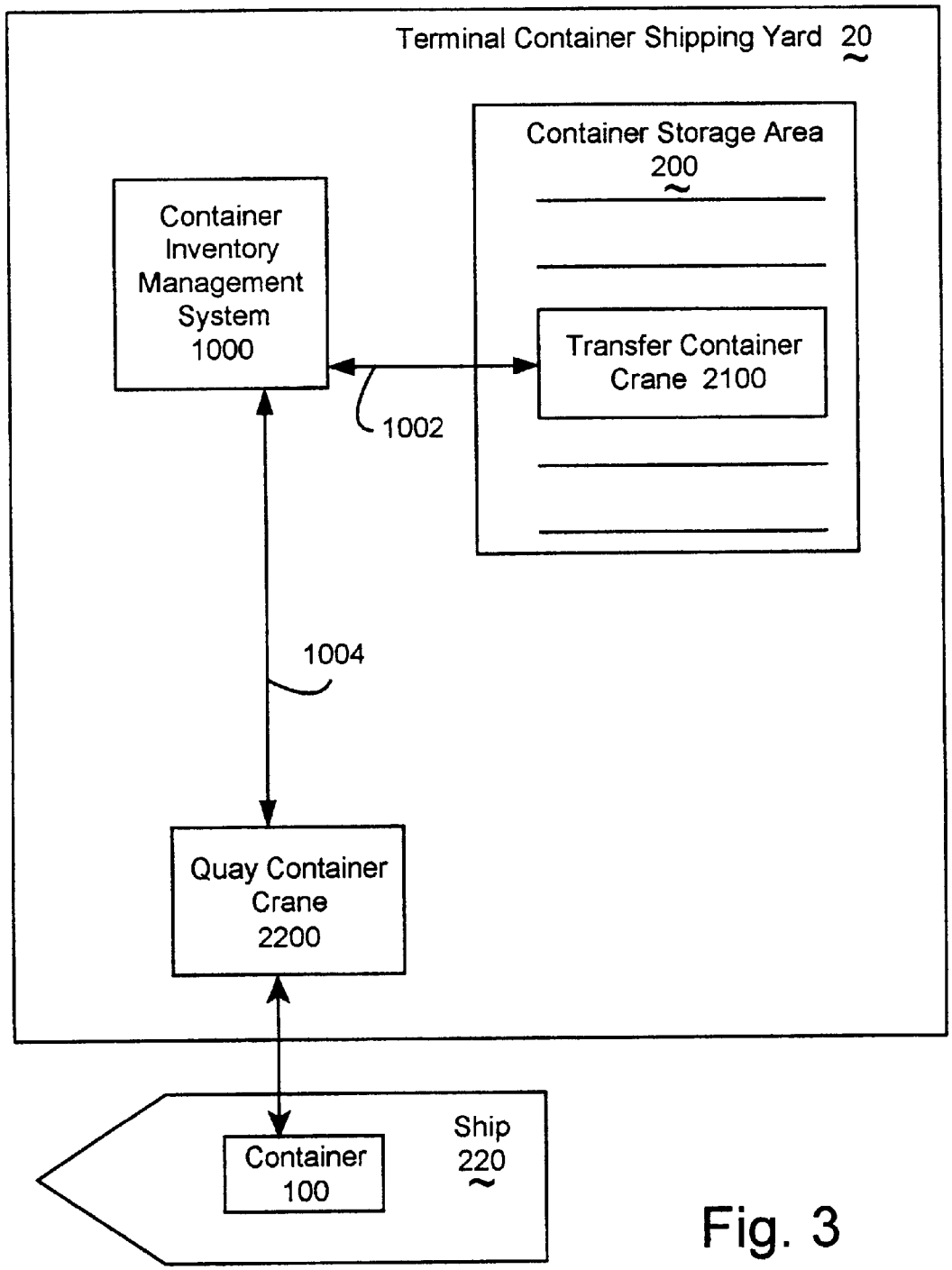
FIG. 3 illustrates a marine shipping yard 20 in accord with the invention.

FIG. 3 illustrates a marine shipping yard 20 in accord with the invention.

Figure 2A:
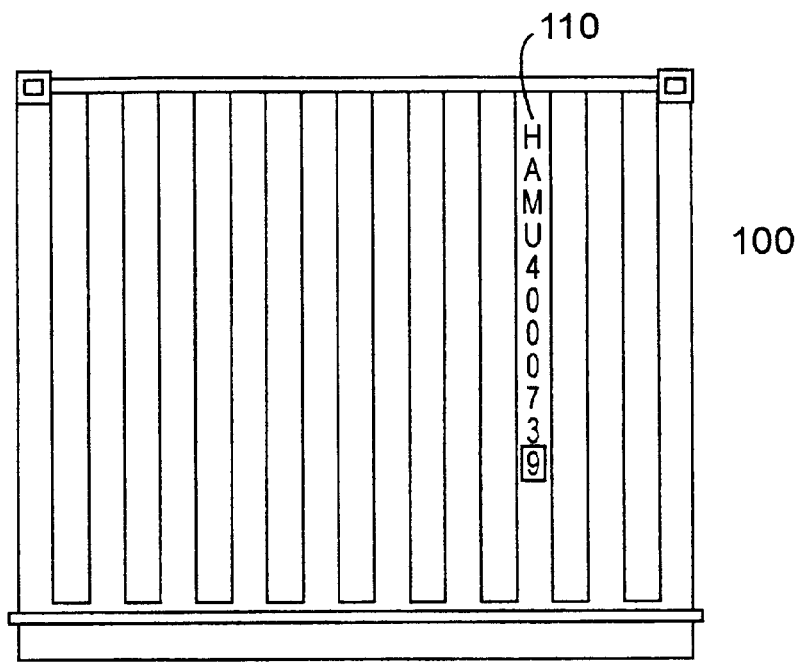
FIGS. 2A and 2B illustrate typical container codes and their representation on the side of a container as found in the prior art.
Figure 2B:
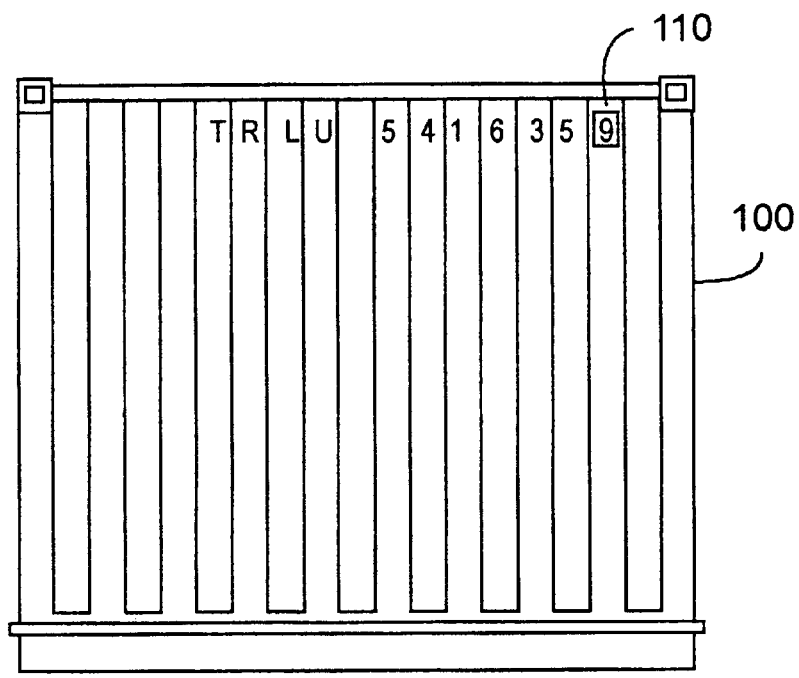

System 1000 uses container code recognition, from quay container crane 2200 shown in FIG. 1, of a container 100, identified by a container code 110 as shown in FIGS. 2A and 2B, to manage at least a container inventory. The invention automatically and efficiently tracks the loading and unloading of the container from ship 220, automatically updating at least a container inventory database.

Figure 4A:
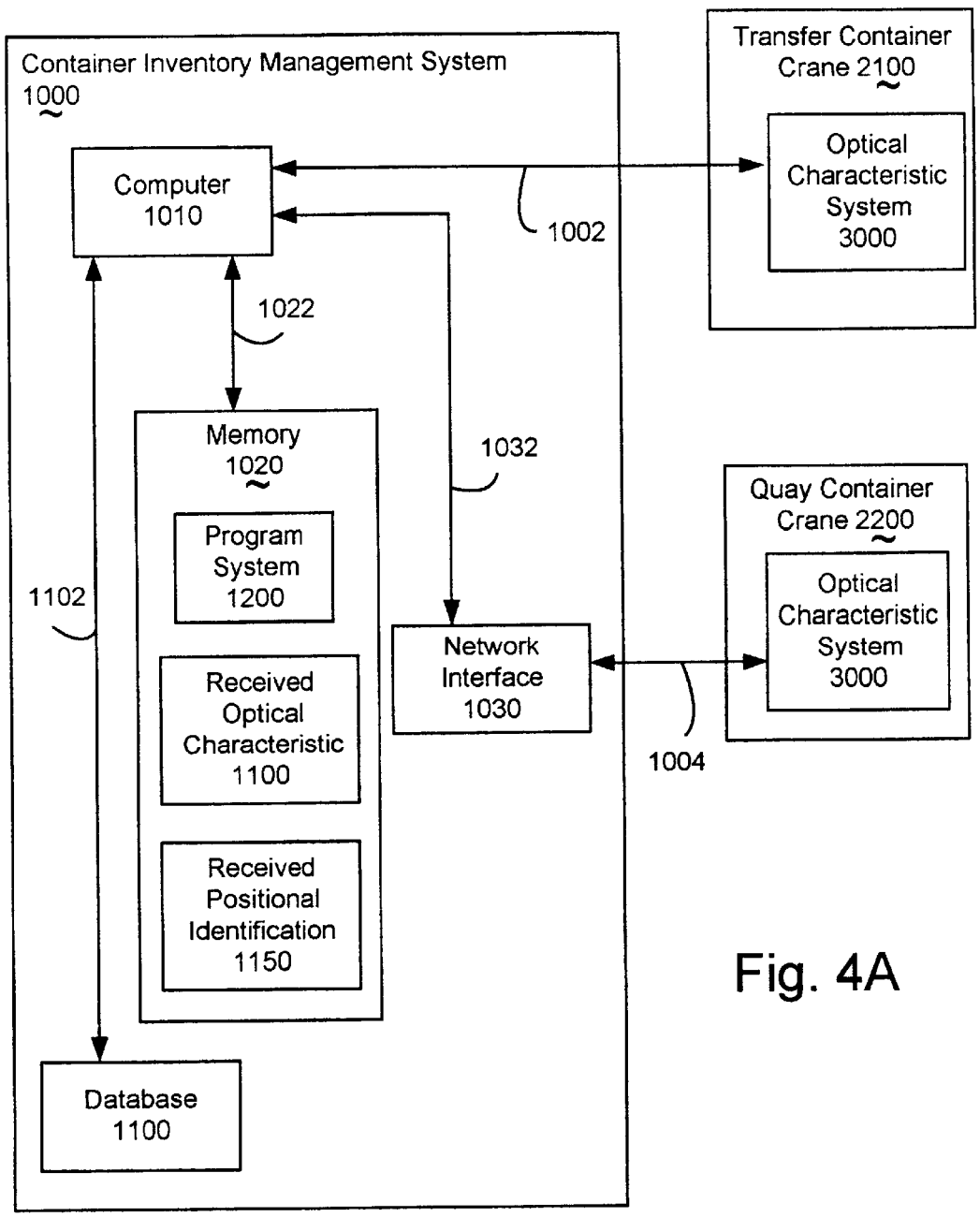
FIG. 4A illustrates a simplified block diagram of the container inventory management system 1000 of FIG. 3 using the optical characteristic recognition systems.

As used herein, a container crane is at least one of the following: a quay side container crane 2200, a transfer container crane 2100, as well as rubber tire gantry container cranes and rail gantry container cranes. Quay container cranes 2200 are illustrated in FIGS. 1, 3, 4A to 5, and 12. Transfer container cranes 2100 are illustrated in FIGS. 1, 3, and 4A. It should be noted that transfer container cranes 2100 are predominantly rubber tire gantry container cranes, while quay container cranes 2200 are predominantly rail gantry container cranes.

FIG. 4A illustrates a simplified block diagram of the container inventory management system 1000 of FIG. 3 using the optical characteristic recognition systems.

The method of operating system 1000 will be discussed in terms of computer 1010, controlled by a program system 1200, including program steps residing in a memory 1020 accessibly coupled 1022 to computer 1010.

The system 1000 further includes computer 1010 communicatively coupled 1002 to optical characteristic system 3000, which is mechanically coupled to transfer container crane 2100.

Computer 1010 is also communicatively coupled to optical characteristic system 3000, mechanically coupled to quay container crane 2200. The communicative coupling of computer 1010 and optical characteristic system 3000 may be at least partially provided by network 1004 through network interface 1030, which in turn communicates 1032 with computer 1010.

Note that in many embodiments of the invention, the communicative coupling of various optical characteristic systems 3000 may employ a uniform coupling mechanism, which in many circumstances may preferably be a network.

Network 1004 may employ at least one member of a physical transport collection in communicating with an optical characteristic system 3000 in quay container crane 2200. The physical transport collection includes at least one wireline physical transport layer and preferably at least one wireless physical transport layer.

Computer 1010 is communicatively coupled 1102 with database 1100. Note that database 1100 may be included in at least one member of a container inventory management collection comprising a marine shipping inventory management system and a rail yard inventory management system.

Note that the system includes received optical characteristic 1100 and received positional identification 1150. In certain systems, it is preferred that both received optical characteristic 1100 and received positional identification 1150 reside in memory 1020. However, the system may include one or both of 1100 and 1150 residing somewhere other than memory 1020, including but not limited to them residing in network interface 1030.

Program system 1200 of FIG. 4A manages at least a container inventory using container code recognition of a container identified by a container code. The container code recognition is performed on the container crane, which may be either a transfer container crane 2100 or a quay container crane 2200 as seen in FIG. 3.

The container inventory management includes the following: Receiving an optical characteristic of the container code and a positional identification of the container to create a received optical characteristic 1100 and a received positional identification 1150. Updating a database with the received container code optical characteristic and the received container positional identification.

As used herein, a computer will be considered to include at least one of the following: an instruction processor, an inferential processor, a finite state machine, and a memory.

An instruction processor will include at least one of the following. A Single Instruction Single Datapath (SISD) processor, a Single Instruction Multiple Datapath (SIMD) processor, a Multiple Instruction Single Datapath (MISD) processor, a Multiple Instruction Multiple Datapath (MIMD) processor, a Complex Instruction Set Computer (CISC), a Reduced Instruction Set Computer (RISC) and a Very Long Instruction Word (VLIW) computer.

An inferential processor will include at least one of the following: a rule-based inferential processor, a constraint-based inferential processor, and a fuzzy logic engine.

A finite state machine will include at least one of the following: at least part of a programmable logic device, at least part of an application specific integrated circuit. A programmable logic device will refer to at least one member of the following: a Field Programmable Gate Array (FPGA), a Programmable Logic Device (PLD), a Complex Programmable Logic Device (CPLD).

As used herein, memory 1020 includes at least one instance of a volatile memory and/or at least one instance of a non-volatile memory. Non-volatile memory includes at least one of the following: a writeable non-volatile memory and a Read Only Memory (ROM). Writeable non-volatile memory includes at least one member of the following: an electro-magnetically interfaced non-volatile memory and an optically interfaced non-volatile memory.

Figure 6A:
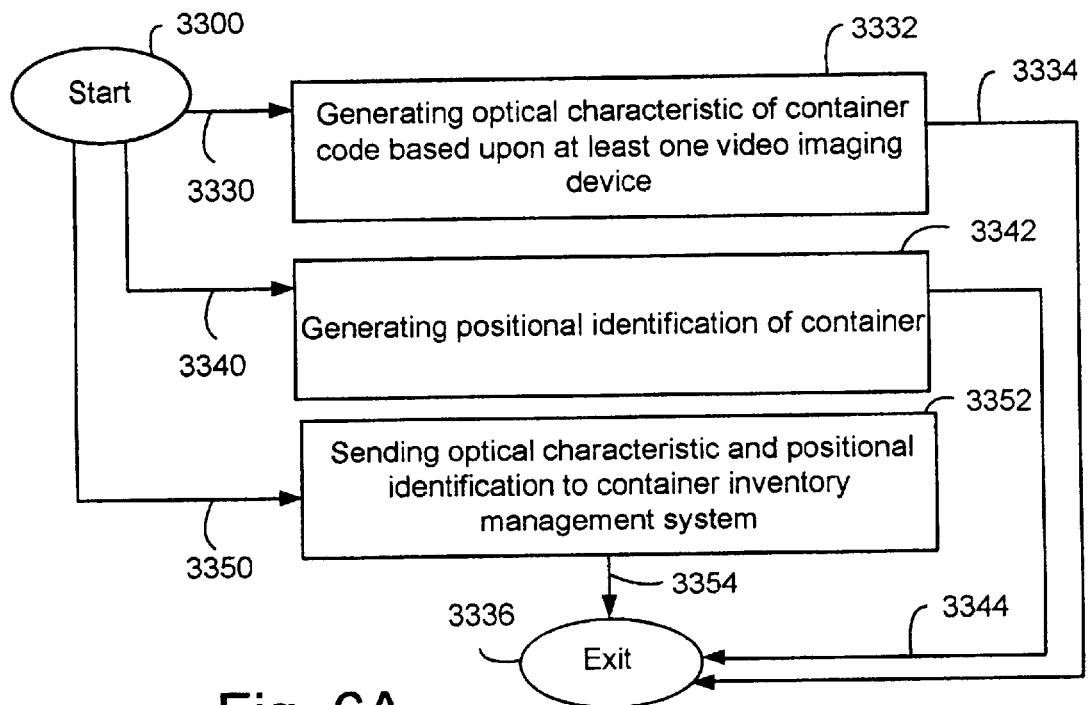
FIG. 6A illustrates a method of operating optical characteristic system 3000 of FIG. 5 as program system 3300 of FIG. 5.
Figure 6B:
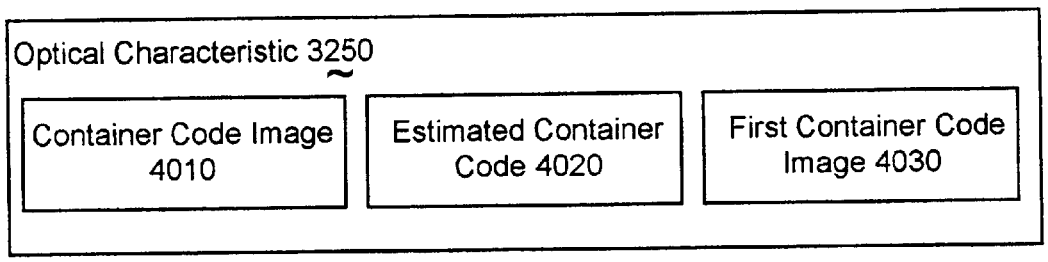
FIG. 6B illustrates certain embodiments of the optical characteristic 3250 from FIG. 5 of the container code 110 of FIGS. 2A–B and 5.

Please refer to FIG. 6B for a discussion of the optical characteristic of the container code.

Receiving the optical characteristic and the positional identification of the container may include the following. Determining a reliability measure of the estimated container code. Examining the container code image to create a second estimated container code, whenever the reliability measure indicates doubt.

Examining the container code image may include at least one of the following. Requesting a modified version of the container code image to create a modified container code image request. Receiving a modified container code image based upon the modified container code image request.

Also note that the modified container code request may include at least one of the following: a zoom-in request; a zoom-out request; a tilt request; a filter request. The filter request may includes at least one of the following: an apply first filter request, an apply second filter request; and an align the first filter to the second filter request.

Figure 6C:
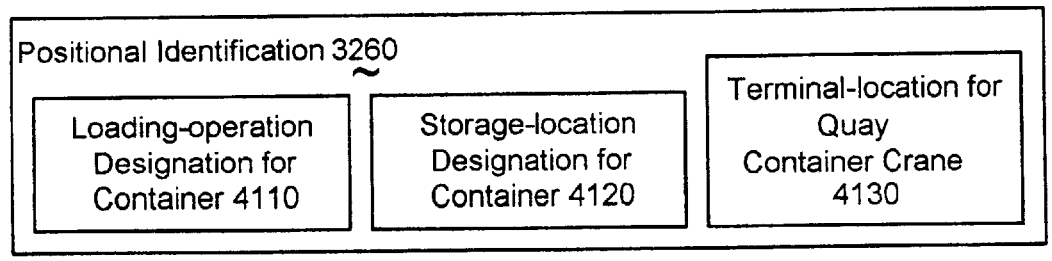
FIG. 6C illustrates positional identification 3260 of FIG. 5 for container 100.

The positional identification of the container as illustrated in FIG. 6C may include at least one of the following: a loading-operation designation for the container, a storage-location designation for the container, and a terminal location for the container crane.

Note that the invention includes embodiments wherein at least one of the storage-location designation and the loading-operation designation for the container, is derived at least in part from the terminal location for the container crane.

Receiving the optical characteristic and the positional identification may include the following. Receiving a packet from a network to create a received packet. Processing the packet to create at least part of the optical characteristic. Processing the packet to create at least part of the positional identification.

The method and system may further include generating a shipping container plan for a ship 220 shown in FIG. 3 loaded by the quay container crane 2200 based upon the database 1100.

Figure 4B:
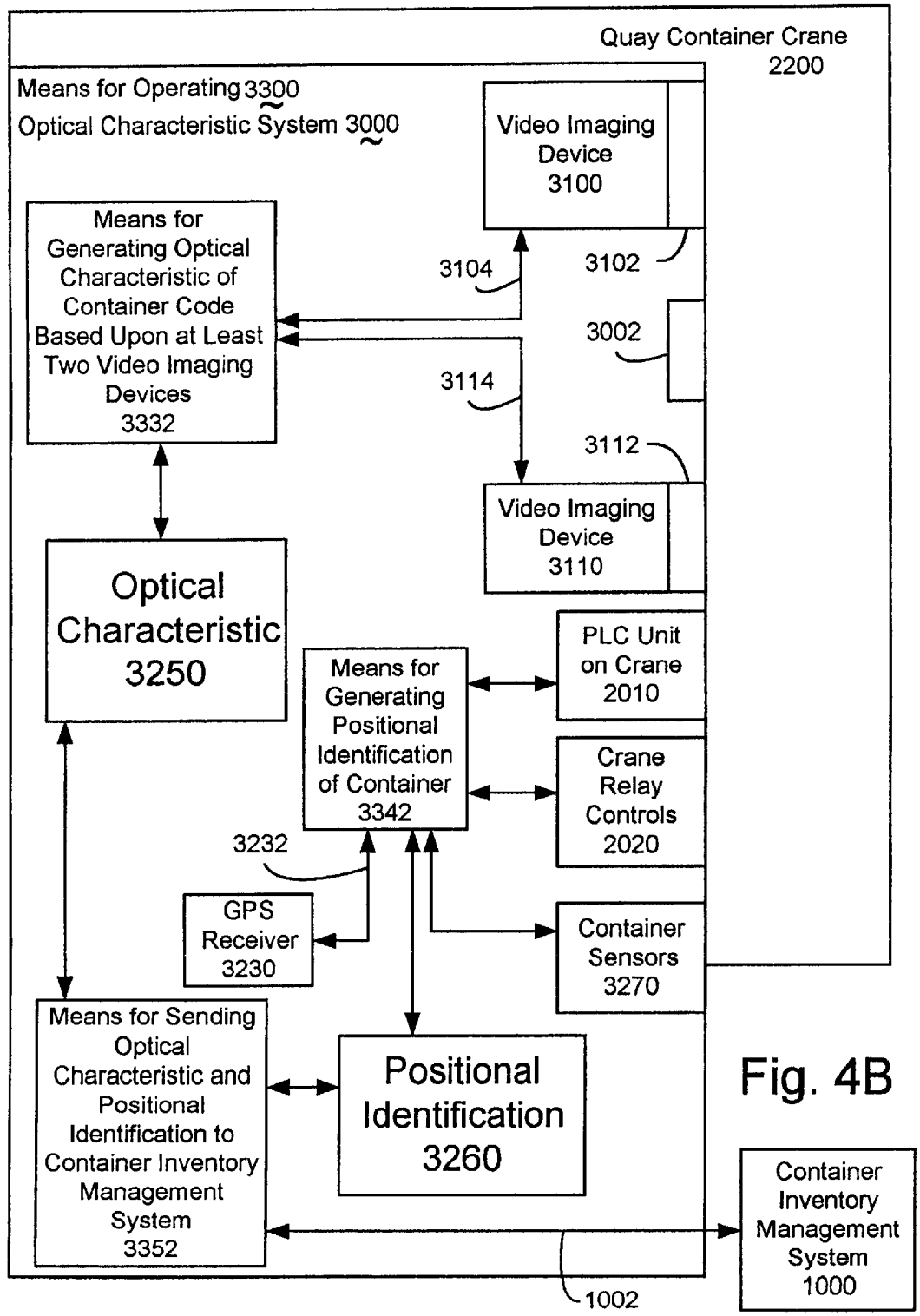
FIG. 4B illustrates a system block diagram of the means for operating 3300 optical characteristic system 3000 implementing the inventive method for automated optical container code recognition with positional identification from a quay container crane 2200 of FIGS. 3 and 4A.

Note that the container inventory management 1000 is not limited to the following discussion, but is included to illustrate only a preferred use of container crane optical characteristic recognition systems 3000 shown in FIG. 4B, coupled to transfer container cranes 2100 and quay container cranes 2200, as shown in FIG. 4A.

FIG. 4B illustrates a system block diagram of the means for operating 3300 optical characteristic system 3000 implementing the inventive method for automated optical container code recognition with positional identification from a quay container crane 2200 of FIGS. 3 and 4A.

Optical characteristic system 3000 includes at least two video imaging devices 3100 and 3110, each communicatively coupled 3104 and 3114, respectively, to means 3332 for generating optical characteristic 3250 of container code based upon at least two video imaging devices 3100 and 3110. Video imaging devices 3100 and 3110 are mechanically coupled 3102 and 3112, respectively, to quay container crane 2200.

Note that optical characteristic recognition system 3000 may also be mechanically coupled 3002 to quay container crane 2200. Mechanical coupling 3002 may preferably include a mechanical shock absorber to improve the reliability of optical characteristic recognition system 3000.

Note that as used herein, a video imaging device such as 3100 belongs to a collection including at least a video camera, a digital video camera, and a charged coupled array. A video imaging device 3100 may further include any of the following: a computer, a digital memory, an image processor and a flash lighting system.

Means 3342 for generating position identification 3260 of the container may include any of the following: Coupling to PLC unit 2010 on quay crane 2200, coupling to quay crane relay controls 2020, and container sensors 3270. Container sensors 3270 may preferably include sensors to ultrasonic transponders. Coupling to PLC unit 2010 may include one or more indications of container locking, often known as twist locking signals.

Means 3342 may include coupling 3232 to a GPS receiver 3230.

Means 3352 for sending optical characteristic 3250 and positional identification 3260 to container inventory management system 1000 is communicatively coupled 1002 to container inventory management system 1000.

Note that as used herein GPS includes any form of global positioning, including but not limited to, DGPS, (Differential Global Positioning System). Today, DGPS is the preferred global positioning form for the invention, but the invention can use any form of global positioning.

Figure 5:
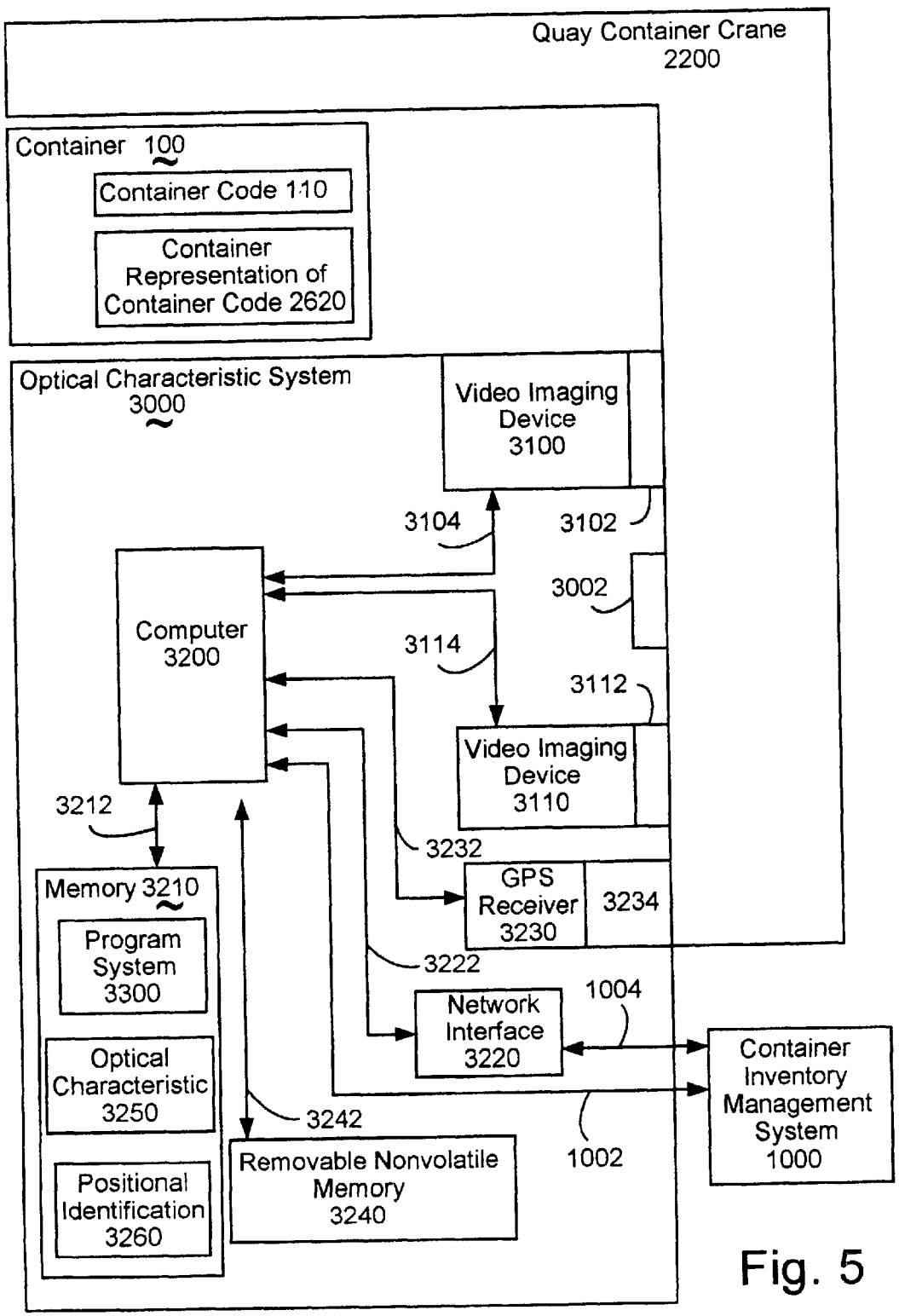
FIG. 5 illustrates a simplified block diagram of an optical characteristic system 3000 providing container code recognition from a quay container crane 2200 of a container 100 identified by a container code 110 to container inventory management system 1000.

FIG. 5 illustrates a simplified block diagram of a preferred optical characteristic system 3000 providing container code recognition from a quay container crane 2200 of a container 100, identified by a container code 110, to container inventory management system 1000, refining FIG. 4B.

Optical characteristic system 3000 includes at least one, and in FIG. 5, two video imaging devices 3100 and 3110, each communicatively coupled 3104 and 3114, respectively, to computer 3200. Video imaging devices 3100 and 3110 are mechanically coupled 3102 and 3112, respectively, to container crane 2000.

Note that optical characteristic recognition system 3000 is mechanically coupled 3002 to quay container crane 2200. Mechanical coupling 3002 preferably includes a mechanical shock absorber to improve the reliability of optical characteristic recognition system 3000.

Computer 3200 accesses memory 3210, which includes program steps of program system 3300, which implement the method of operating 3300 the optical characteristic system 3000. The method will be further documented in the discussion of FIGS. 6A through 11C.

The invention may incorporate a number of location determination mechanisms including GPS receiver 3230 communicatively coupled 3232 with computer 3200 as shown in FIG. 5. Note that GPS receiver 3230 may be further mechanically coupled 3234 with quay container crane 2200 as shown in FIG. 5.

The invention is preferably communicatively coupled 1002 with container inventory management system 1000. The invention may further preferably include a network interface 3220 with network 1004 providing a coupling from computer 3200 via 3222-3220-1004 with container inventory management system 1000.

Network 1004 employs at least one member of a physical transport collection in communicating from the container crane 2000 to container inventory management system 1000. The physical transport collection includes at least one wireline physical transport layer and preferably at least one wireless physical transport layer.

Network 1004 preferably employs a packet based communications protocol, which may further preferably provide compatibility to the IEEE 802.11(b) communications standard.

FIG. 6A illustrates a method of operating optical characteristic system 3000 of FIG. 5 as program system 3300 of FIG. 5.

Operation 3332 performs generating an optical characteristic 3250 of container code 110 based upon at least one of video imaging devices 3100 and 3110 shown in FIG. 5. Optical characteristics 3250 will be further discussed in FIG. 6B.

Operation 3342 performs generating a positional identification 3260 of container 100. Positional identification 3260 is further discussed in FIG. 6C.

Operation 3352 performs sending optical characteristic 3250 of container code 110 and positional identification 3260 of container 100 to container inventory management system 1000 as shown in FIGS. 4B and 5.

FIG. 6B illustrates certain embodiments of the optical characteristic 3250 from FIG. 5 of the container code 110 of FIGS. 2A–B and 5.

The optical characteristic 3250 of the container code 110 includes at least one member of the following: at least one container code image 4010 of a container representation 2620 of the container code 110 imaged from the container crane 2000. The optical characteristic 3250 may also include an estimated container code 4020 based upon an optical character recognition process applied to the container code image 4010. Additionally, optical characteristic 3250 may include a first container code image 4030, which may be further processed and/or modified to create container code image 4010.

FIG. 6C illustrates positional identification 3260 of FIG. 5 for container 100.

Positional identification 3260 may further include at least one of the following: a loading operation designation 4110 for container 100, a storage-location designation 4120 for container 100 and a terminal location 4130 for quay container crane 2200.

Figure 7:
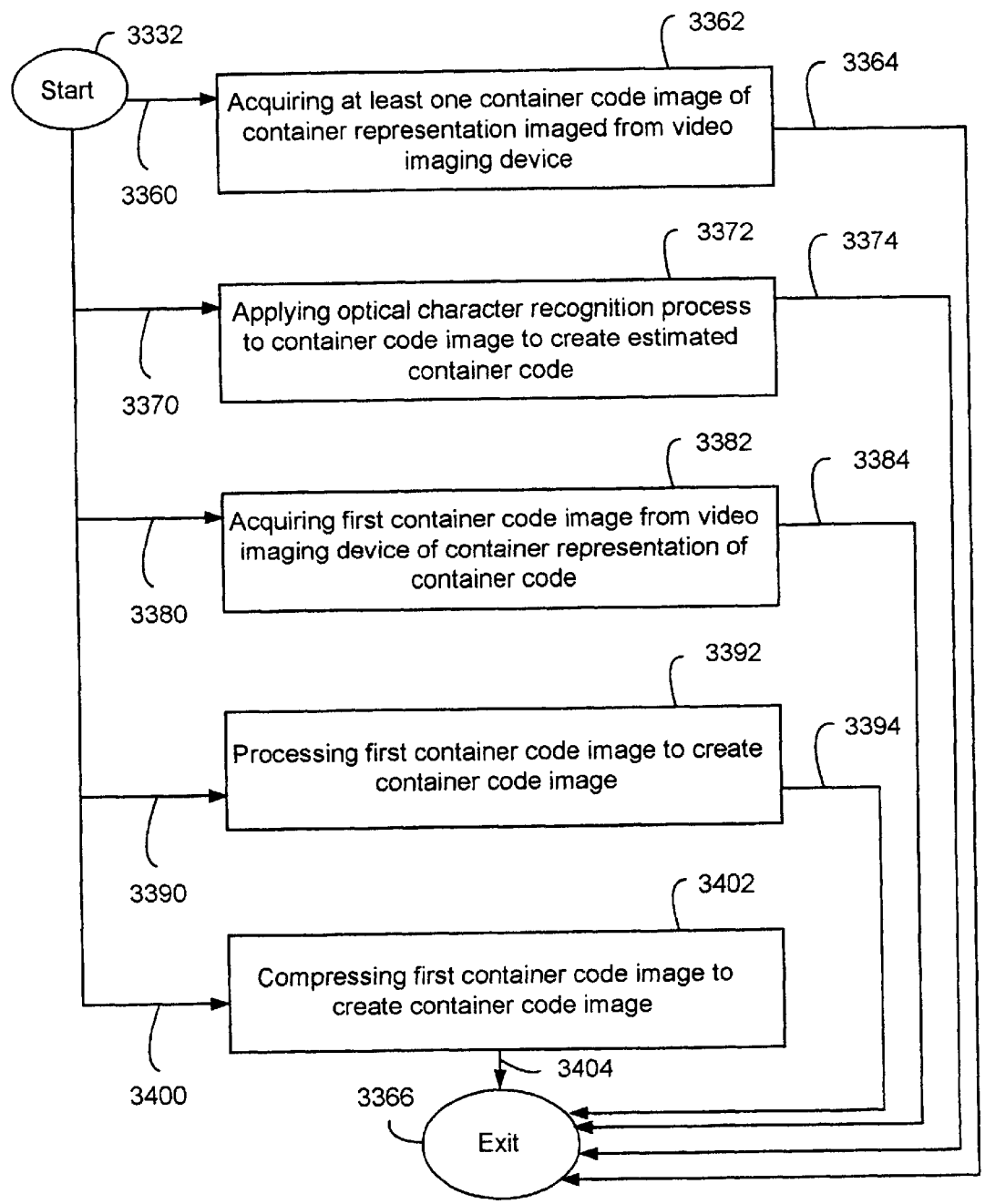
FIG. 7 illustrates a detail flowchart of operation 3332 of FIG. 6A for generating the optical characteristic of the container code.

Note that the invention may include one or more of the operations of FIG. 7.

FIG. 7 illustrates a detail flowchart of operation 3332 of FIG. 6A for generating the optical characteristic of the container code.

Operation 3362 performs acquiring at least one container code image of a container representation of the container code imaged from the video imaging device.

Operation 3372 performs applying an optical character recognition process to the container code image to create an estimated container code.

Operation 3382 performs acquiring a first container code image from the video imaging device of the container representation of the container code.

Operation 3392 performs processing the first container code image to create the container code image.

Operation 3402 performs compressing the first container code image to create the container code image.

Figure 8A:
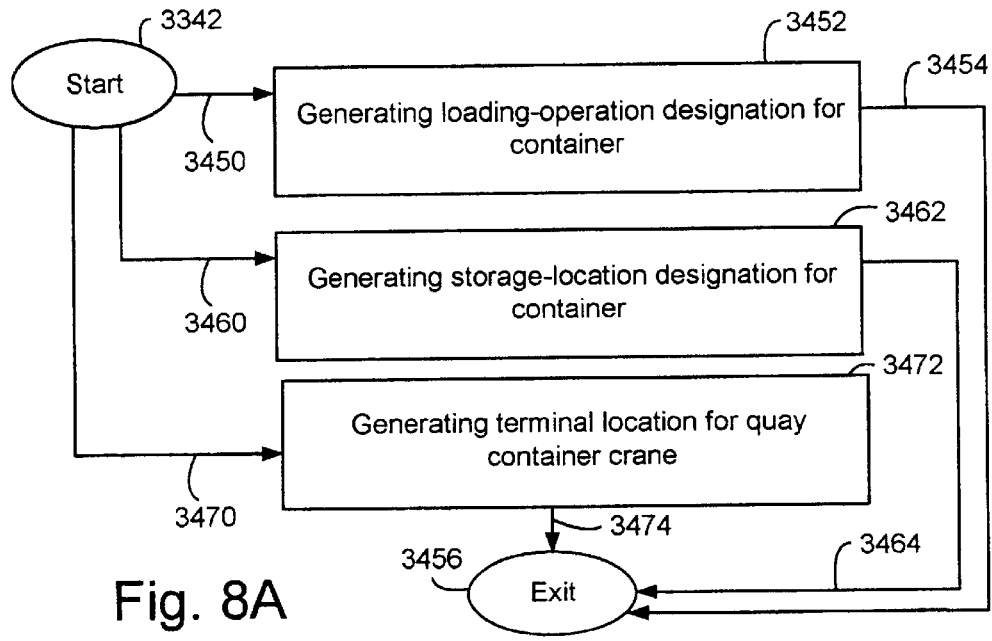
FIG. 8A illustrates a detail flowchart of operation 3342 of FIG. 6A for generating the positional identification of the container.

The invention may also include one or more of the operations of FIG. 8A.

FIG. 8A illustrates a detail flowchart of operation 3342 of FIG. 6A for generating the positional identification of the container.

Operation 3452 performs generating a loading-operation designation for the container.

Operation 3462 performs generating a storage-location designation for the container.

Operation 3472 performs generating a terminal location for the quay container crane 2200 shown in FIG. 5.

Figure 8B:
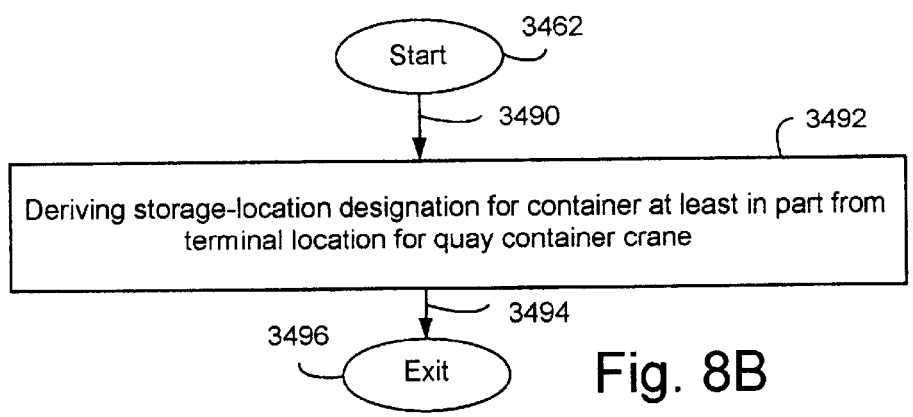
FIG. 8B illustrates a detail flowchart of operation 3462 of FIG. 8A for generating the storage-location designation.

FIG. 8B illustrates a detail flowchart of operation 3462 of FIG. 8A for generating the storage-location designation.

Operation 3492 performs deriving the storage-location designation for the container at least in part from the terminal location for the quay container crane 2200 shown in FIG. 5.

Figure 8C:
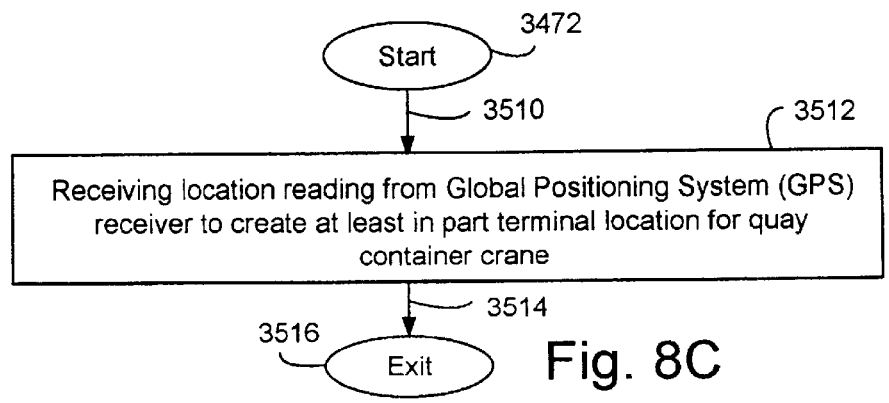
FIG. 8C illustrates a detail flowchart of operation 3472 of FIG. 8A for generating the terminal location for the quay container crane 2200.

FIG. 8C illustrates a detail flowchart of operation 3472 of FIG. 8A for generating the terminal location for the quay container crane 2200 shown in FIG. 5.

Operation 3512 performs receiving a location reading from a Global Positioning System (GPS) receiver 3230 to create at least in part the terminal location for the quay container crane 2200 shown in FIG. 5.

Figure 9A:
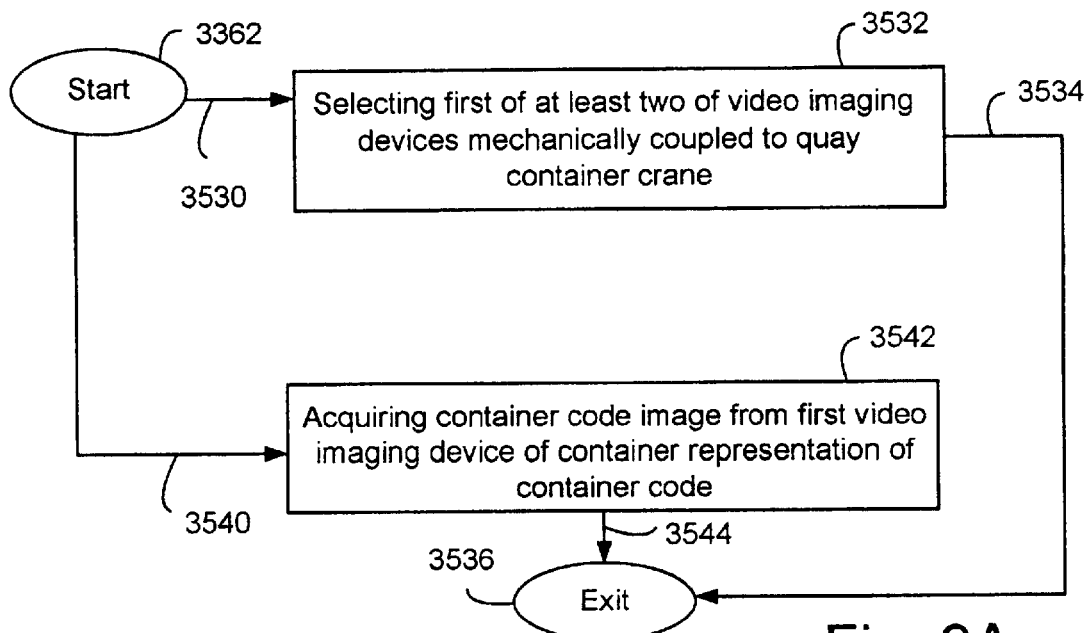
FIG. 9A illustrates a detail flowchart of operation 3362 of FIG. 7 for acquiring the container code image.

The invention may include at least one of the operations of FIG. 9A.

FIG. 9A illustrates a detail flowchart of operation 3362 of FIG. 7 for acquiring the container code image.

Operation 3532 performs selecting a first of at least two of the video imaging devices mechanically coupled to the quay container crane 2200 shown in FIG. 5.

Operation 3542 performs acquiring the container code image from the first video imaging device of the container representation of the container code 110 shown in FIG. 5.

Figure 9B:
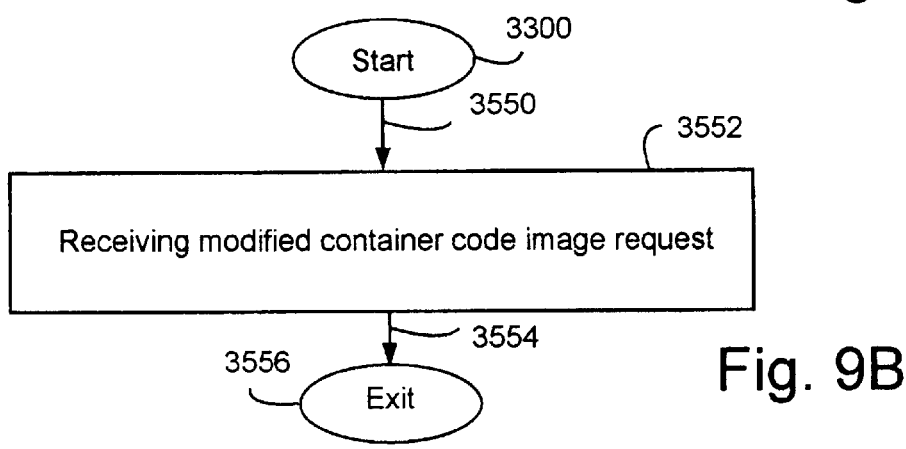
FIG. 9B illustrates a detail flowchart of program system 3300 of FIG. 5 implementing the method of operating the optical characteristic recognition system.

FIG. 9B illustrates a detail flowchart of program system 3300 of FIG. 5 implementing the method of operating the optical characteristic recognition system.

Operation 3552 performs receiving a modified container code image request.

Figure 9C:
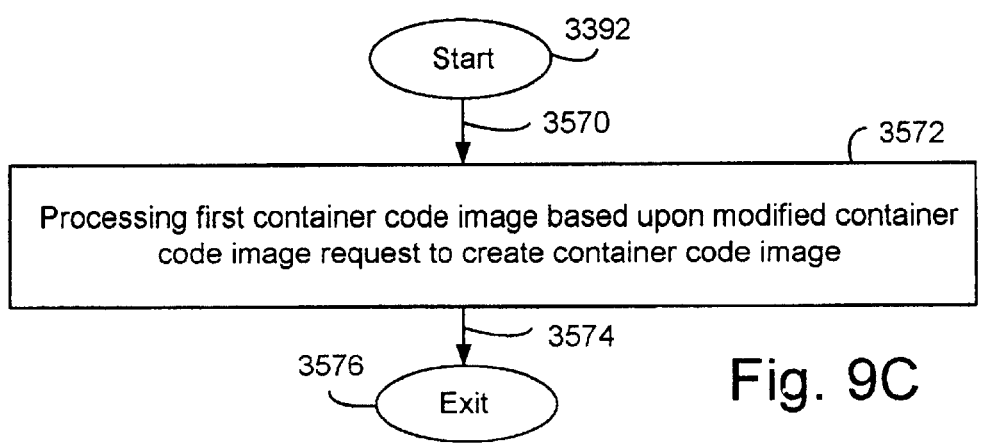
FIG. 9C illustrates a detail flowchart of operation 3392 of FIG. 7 for processing the first container code image.

FIG. 9C illustrates a detail flowchart of operation 3392 of FIG. 7 for processing the first container code image.

Operation 3572 performs processing the first container code image based upon the modified container code image request to create the container code image.

Figure 10:
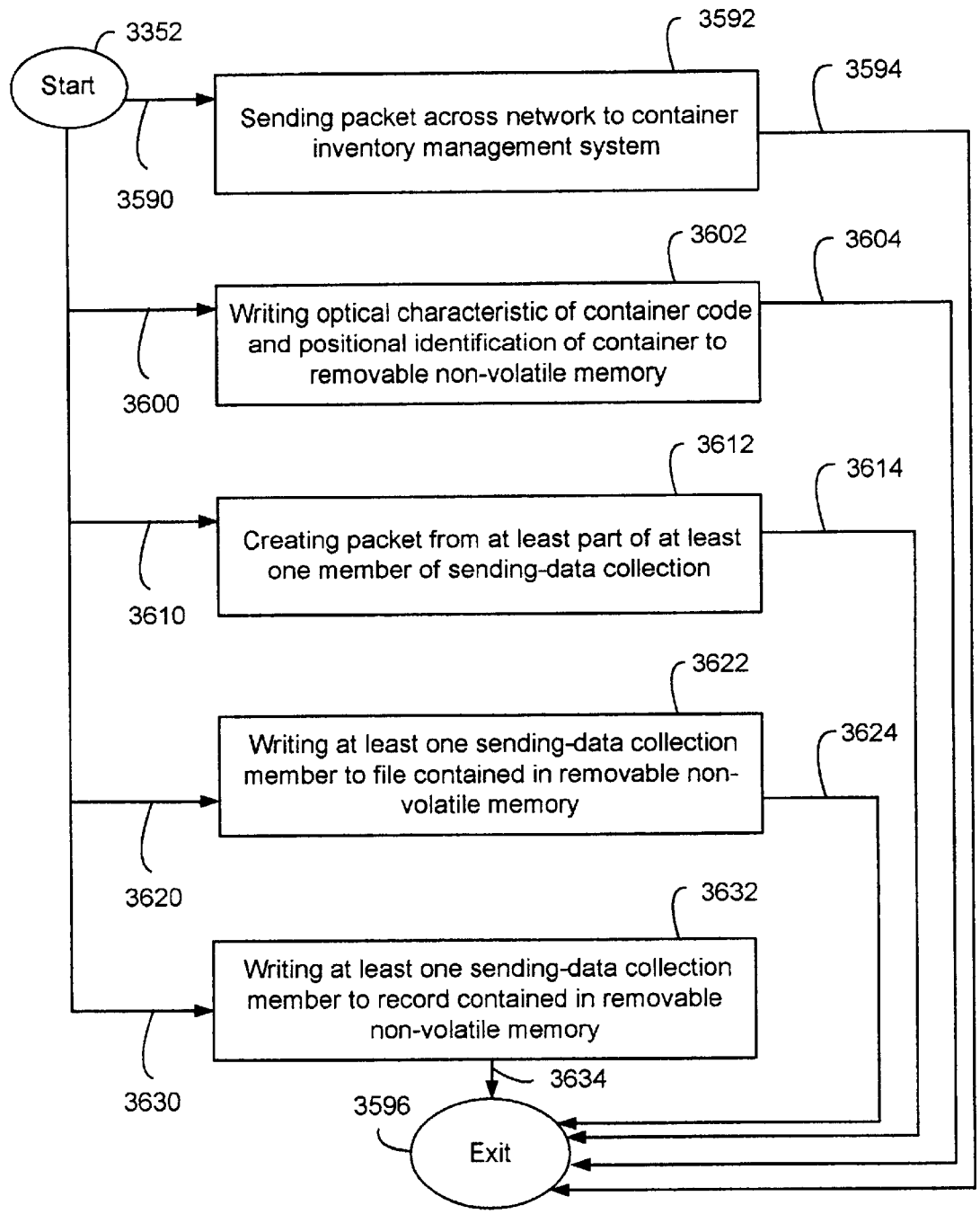
FIG. 10 illustrates a detail flowchart of operation 3352 of FIG. 6A for sending the optical characteristic and the positional identification.

The invention may include at least one of the operations of FIG. 10.

FIG. 10 illustrates a detail flowchart of operation 3352 of FIG. 6A for sending the optical characteristic 3250 and the positional identification 3260 shown in FIGS. 5, 6B and 6C.

Operation 3592 performs sending a packet across a network 1004 to the container inventory management system 1000 as shown in FIGS. 4A and 5.

Operation 3602 performs writing the optical characteristic 3250 of the container code 110 and the positional identification 3260 of the container 100 to 3242 a removable non-volatile memory 3240 as shown 5.

Operation 3612 performs creating the packet from at least part of at least one sending-data collection member.

Operation 3622 performs writing at least one sending-data collection member to a file contained in the removable non-volatile memory 3240 shown in FIG. 5.

Operation 3632 performs writing at least one sending-data collection member to a record contained in the removable non-volatile memory 3240 shown in FIG. 5.

Note that the sending-data collection includes the optical characteristic 3250 of the container code 110 and the positional identification 3260 of the container 100 as shown in FIG. 5.

Figure 11A:
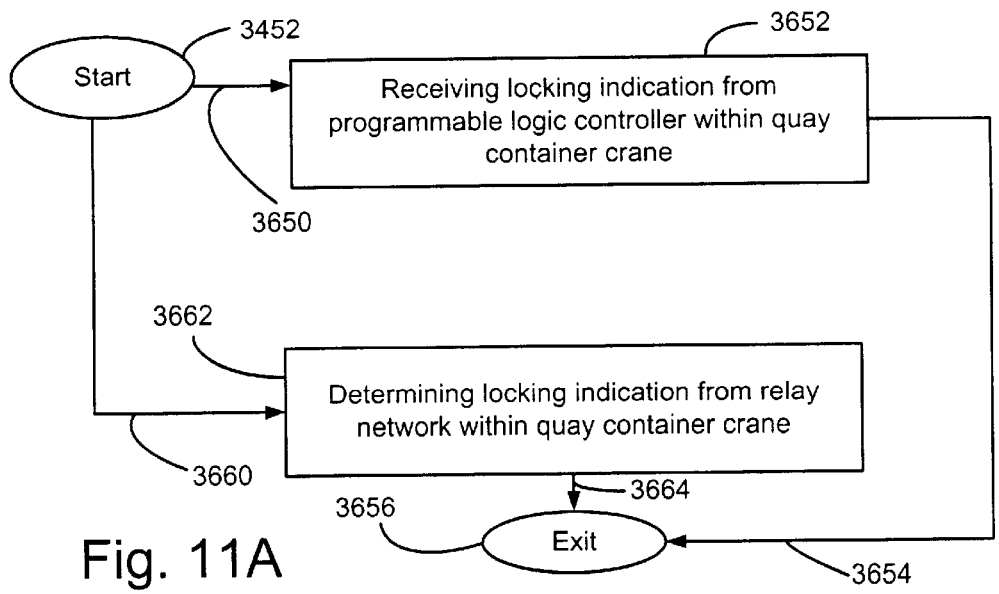
FIGS. 11A–11C illustrate various detail flowcharts of operation 3452 of FIG. 8A for generating the loading-operation.

The invention may include one of the operations of FIG. 11A.

FIG. 11A illustrates a detail flowchart of operation 3452 of FIG. 8A for generating the loading-operation.

Operation 3652 performs receiving a locking indication from a programmable logic controller 2010 within the quay container crane 2200 as shown in FIG. 4B.

Operation 3662 performs determining the locking indication from a relay network 2020 within the quay container crane 2200 as shown in FIG. 4B.

Figure 11B:
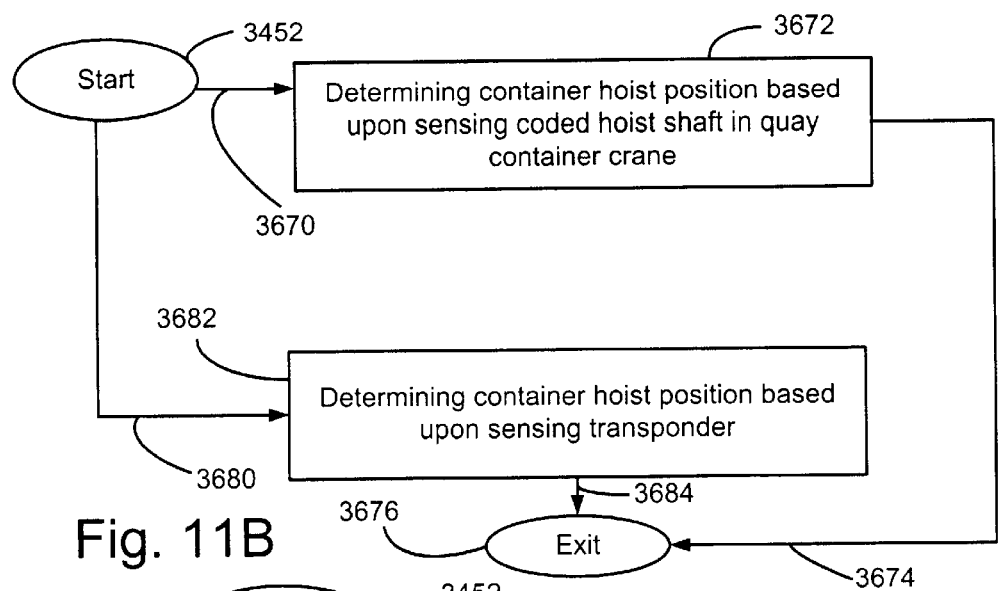

The invention may include one of the operations of FIG. 11B.

FIG. 11B illustrates a detail flowchart of operation 3452 of FIG. 8A for generating the loading-operation.

Operation 3672 performs determining a container hoist-trolley position based upon sensing a coded hoist shaft in the quay container crane 2200.

Operation 3682 performs determining the container hoist-trolley position based upon sensing ultrasonic transponder 3270 as shown in FIG. 4B.

The coded hoist shaft preferably uses a gray code but the invention may use any coded hoist shaft.

Note that a hoist-trolley position as used herein will refer to a hoist position and/or a trolley position.

Figure 11C:
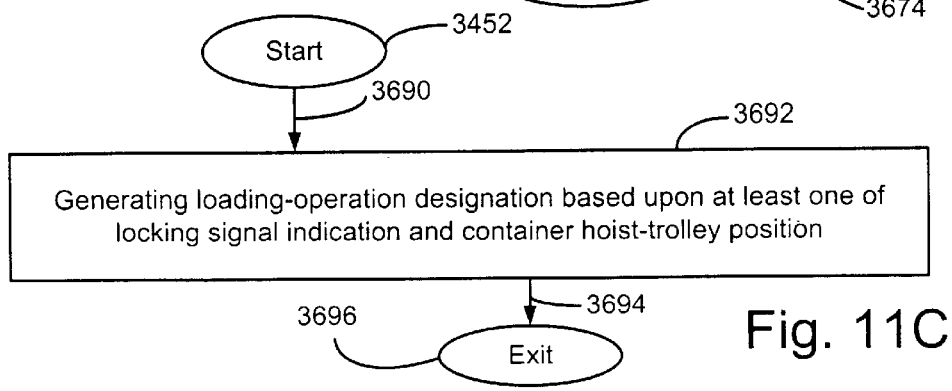

FIG. 11C illustrates a detail flowchart of operation 3452 of FIG. 8A for generating the loading-operation.

Operation 3692 performs generating the loading-operation designation based upon at least one member of the collection comprising the locking signal indication and the container hoist position.

Figure 12:
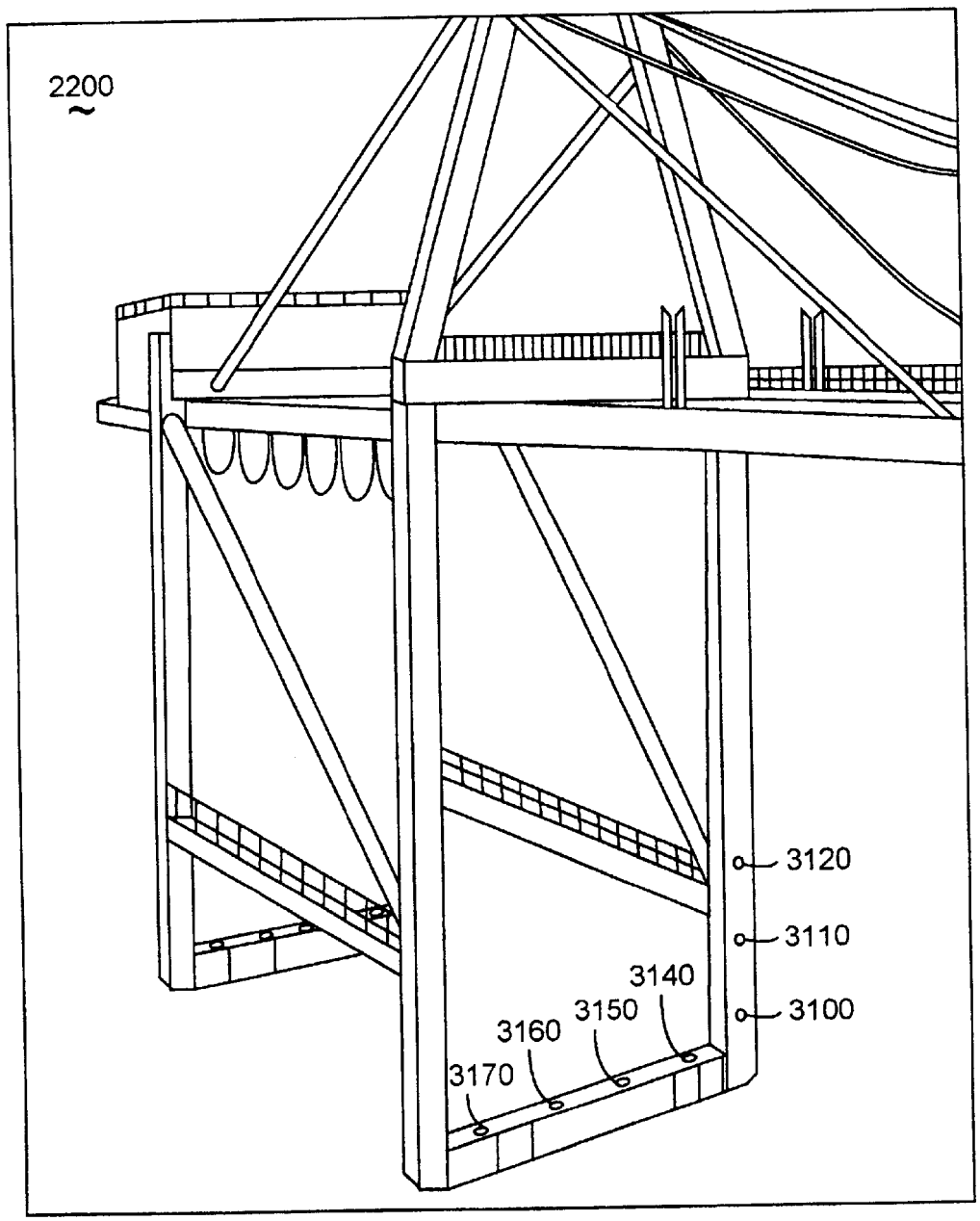
FIG. 12 illustrates a preferred optical characteristic recognition system 3000 with video imaging devices mechanically coupled to Quay container crane 2200 as found in FIGS. 3 and 4A.

FIG. 12 illustrates a preferred optical characteristic recognition system with video imaging devices mechanically coupled to Quay container crane 2200 as found in FIGS. 3 to 5.

The optical characteristic recognition system 3000 tracks the containers as they are transferred to and from shore and ship 220 as shown in FIG. 1. Each container's unique ID code is optically read as it passes through the container crane's seaside legs, shown in FIG. 12.

The container code information is preferably processed by computer 3200 shown in FIG. 5 installed on quay container crane 2200. The updated container status is sent to a container inventory management system 1000 shown in FIGS. 3 to 5, often located at a central office for the container facility. The computer 3200 will interface with the container inventory management system 1000 identifying whether the container 100 is being added or substracted from the terminal's inventory listing.

Each time quay container crane 2200 shown in FIGS. 3 to 5 picks up a container 100 from a chassis or deposits a container onto a chassis, the container code 110 will preferably be read. The container identification is preferably received by computer 3200 shown in FIG. 5.

When the container reaches its final location, this information is then sent to the container inventory management system 1000 as shown in FIGS. 4A to 5, which updates the master inventory and location listing database 1100 shown in FIG. 4A.

All container movements are preferably tracked and updated in real time giving terminal management essentially immediate knowledge of all containers at all times.

The container code 110 is preferably read as containers 100 are placed on or removed from a chassis. The container code 110 is identified by the optical characteristic recognition system 3000 shown in FIGS. 4B and 5.

Figure 13:
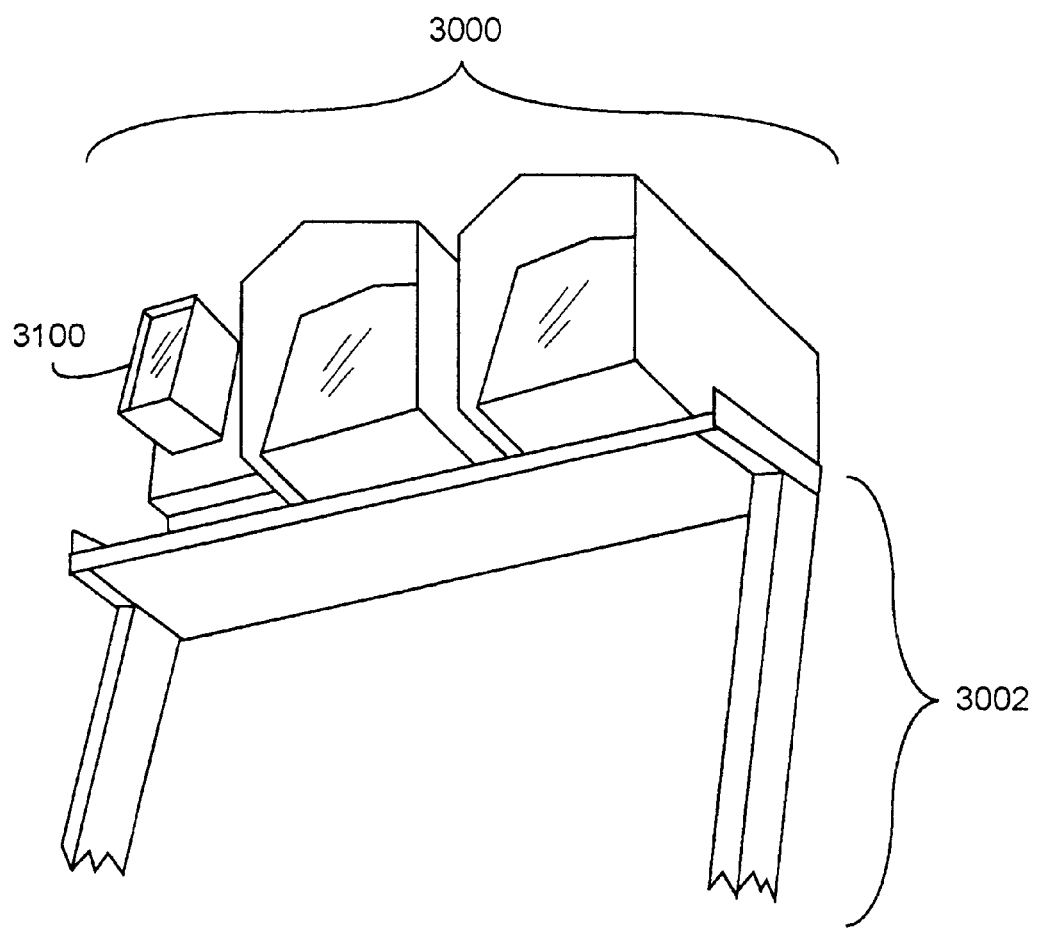
FIG. 13 illustrates a preferred embodiment of at least part of the mechanical housing of an optical characteristic recoginition system.

FIG. 13 illustrates a preferred embodiment of at least part of the mechanical housing of an optical characteristic recoginition system 3000 of FIGS. 3 to 5.

The mechanical housing of the optical characteristic recognition system includes at least one video imaging device, as well as preferably including flash lighting, the triggering and systems as illustrated in the block diagram of FIG. 5. As to the triggering system, it may include a laser photo and/or a infra-red photo sensor.

Other circuitry coupled with a container crane may provide additional storage location information and/or additional information regarding the container contents used by computer 3200 shown in FIG. 5.

Figure 14:
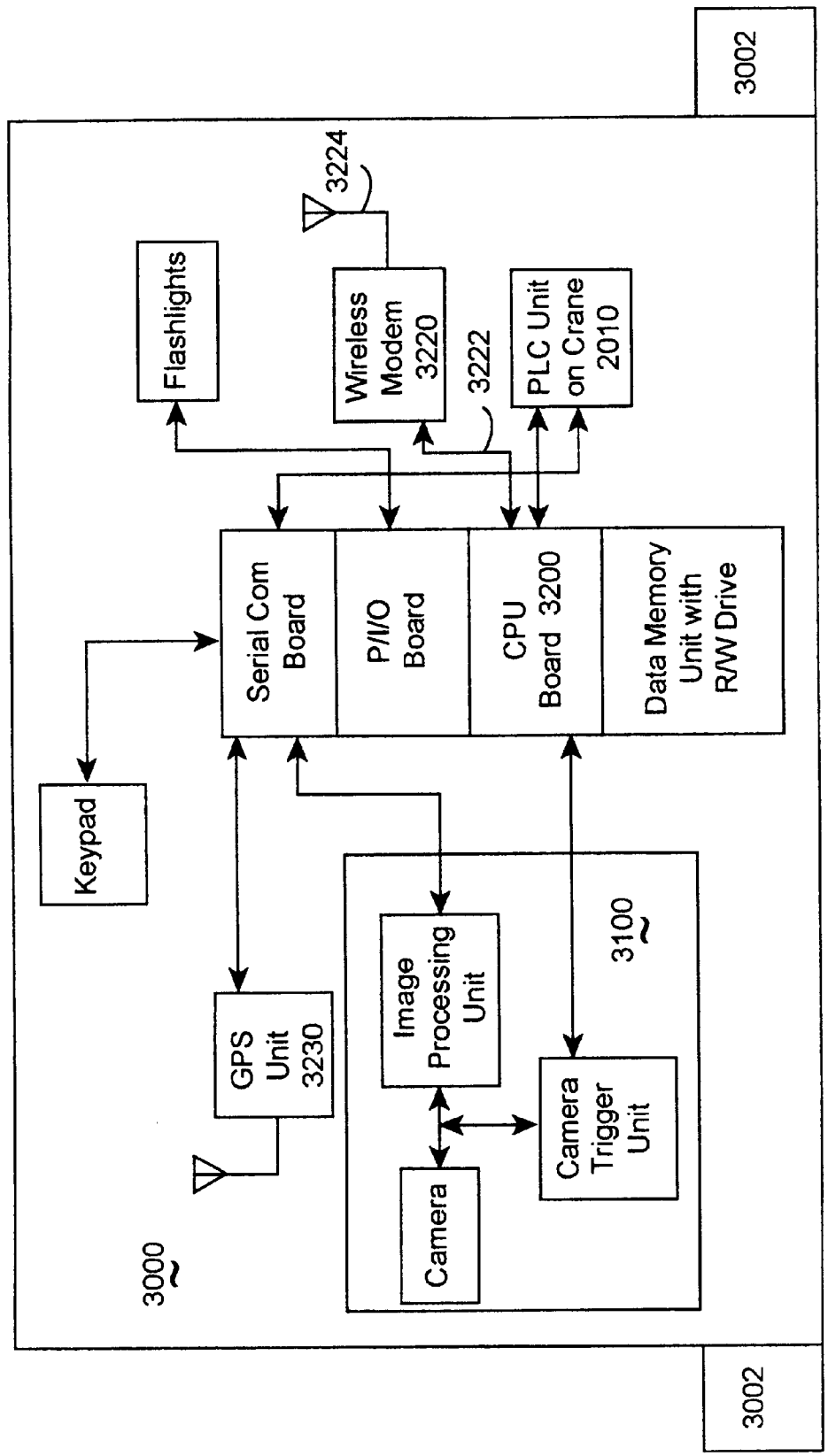
FIG. 14 illustrates a simplified block diagram of a preferred optical recognition system 3000.

FIG. 14 illustrates a simplified block diagram of a preferred optical recognition system 3000 as shown in FIGS. 4B and 5.

Note that container storage areas can be individually separated and not necessarily identified as repository locations located upon a predefined grid, as is often the case in container stacking areas.

The optical characteristic recognition system 3000 can be installed on quay container cranes 2200 to identify containers at wharfside, and on transfer carrier container cranes 2100, to identify containers in single or multiple stack container storage.

Note that FIGS. 12 and 13 illustrate at least two and sometimes several video imaging devices (3100-3170) may be preferred in various applications of the inventive optical characteristic systems 3000 as shown in FIGS. 4B and 5.

Each video imaging device preferably has automatic focus control accommodating both the ambient light conditions and the target located at a distance.

Preferably, illumination for video imaging is provided by a flash light system. Generally, it includes strobe action to catch the image during daytime and at night in the absence of light. The trigger of the video imaging device is preferably based on at least the loading/unloading conditions on the container crane.

The loading/unloading conditions on the container crane can preferably be obtained from the Programmable Logic Controller (PLC) 2010 on quay container crane 2200 or from sensors 3270 shown in FIG. 4A checking whether there is a container to be loaded/unloaded. The sensors 3270 can be laser, infrared, or ultrasonic sensors. Today, laser sensors are more reliable and accurate, but, more expensive than the infrared, currently making infrared sensors preferable on a cost basis and laser sensors more preferable on a reliability and accuracy basis.

The video imaging device may preferably include both an optical character recognition process and an image processing unit to convert the container code images into a standard format. The standard format is preferably compatible with some version of JPEG.

Storage location for a container is provided by the invention to identify the container's repository address. A DGPS unit 3230 shown in FIGS. 4B, 5 and 14 preferably determines the Z axis location of a transfer container crane. Signals of a PLC coupled with the transfer container crane can determine the X and Y axes. This determines the overall position of the container.

The DGPS unit 3230 as shown in FIGS. 4B, 5 and 14, is preferably used in applications with transfer container cranes 2100 as shown in FIGS. 3 and 4A, due to the importance of their location. However, quay container cranes 2200 shown in FIGS. 4A to 5, do not have the same crane location accuracy requirements, making the use of DGPS receivers 3230 less preferable.

In some cases, the address identifier for the repository locations in the container terminal storage areas are not adequately marked by optical character reading, radioactivity identification, or electronic/magnetic detection.

In some cases, a less sophisticated version of the invention is preferred, where the container location is operator input through a hand-held keypad.

The optical characteristic recognition system 3000 is preferably mounted on a movable container crane and able to operate in all types of weather.

The optical characteristic system 3000 may be automatically aimed by the container crane, remotely controlled, and/or hand-held by an operator to interrogate the address for the cargo containers.

The container code 100 as optical characteristic 3250 and positional identification 3260 are sent to the container inventory management system 1000 as shown in Figures to verify whether the container is deposited at the proper address.

The information may be sent by floppy disk. The data/information is downloaded onto a transportable data storage unit such as a floppy disk, and hand carried to the container inventory management computer system.

As shown in FIG. 5, the container crane's optical characteristic system 3000 generates information to send to the container inventory management system 1000.

At least the quay container crane 2200 coupled PLC 2010 shown in FIGS. 4B and 14, and possibly GPS unit 3230, are preferably used to generate the positional identification. Both signals are sent to computer 3200 as shown in FIG. 14.

Computer 3200 as shown in FIG. 14 may also be coupled with a serial communication board to interpret the signals sent to it. Computer 3200 may also be coupled with a digital signal circuit interacting with any or all of the following: switches, buzzers, and lights.

Computer 3200 preferably functions as a traffic controller, which manages the transmission of the data through the network interface or wireless modem 3220 shown in FIGS. 5 and 12, which converts and transmits the signals to the container inventory management system 1000 as shown in FIGS. 3 to 5.

Computer 3200 preferably determines which signals are to be sent and in which order. The serial communication board preferably receives signals from the outside units such as video imaging devices 3100 and 3110 as shown in FIGS. 4B and 5, as well as GPS receiver 3230 shown in FIGS. 4B, 5 and 14.

Computer 3200 translates them into a form that computer 1010 shown in FIG. 4A can process. The removable nonvolatile memory 3240 preferably stores the optical characteristic 3250 shown in FIGS. 4B, 5, and 6B, and positional identification 3260 shown in FIGS. 4B, 5, and 6C. Note that removable nonvolatile media includes, but is not limited to, floppy disks, zip disks, and optical disks.

Assume a container crane operator directs the optical characteristic system 3000. The operator can be provided with a hand-held computer input or keypad, allowing the input of data. The operator inputs the data when he locates a target container as well as changes to other data in the container inventory management system.

The light and buzzers preferably allow the container inventory management system 1000 shown in FIGS. 3 to 5 send messages to the container crane operator as well as allow the quay container crane 2200 equipment to communicate with the human operator.

For example, the lights and buzzers may preferably indicate a malfunction in the optical characteristic system 3000 and/or the location determination and/or completion of an operation such as informing the operator that a target container has been found.

Network interface 1030 may preferably include a stationary wireless modem unit connected 1032 to computer 1010 as shown in FIG. 4A. It allows the container crane's optical characteristic system 3000 and computer 1010 to exchange information. The modem 1030 receives the data transmitted by optical characteristic system 3000 and program system 1200 receives the new data and updates via 1102 database 1100 as shown in FIG. 4A.

Note that the coupling 1102 shown in FIG. 4A is often preferably a Local Area Network (LAN). Note that each container inventory management system 1000 may employ different LANs 1102. Computer 1010 translates the received container code and positional identification into the reigning language of LAN 1102. Note that multiple workstation computers may further be connected to LAN 1102.

The invention also includes methods identifying container code and determining container locations in at least terminal storage areas. The steps can be described as follows:

(1) Provide an optical characteristic recognition system 3000 on a quay container crane 2200 shown in FIGS. 4A to 5 and 14 to interrogate the representations 2620 shown in FIG. 5 of the container code 110 of a cargo container 100;

(2) Aim the optical characteristic recognition system 3000 at the container code representation 2620 shown in FIG. 5, generate at least one optical characteristic 3250 for the container code 110 and send the optical characteristic 3250 to the container inventory management system 1000 as shown in FIGS. 4B, 5 and 6A;

(3) Determine the positional identification 3260 of the container 100 as shown in FIGS. 4B, 5 and 6A;

(4) Send the positional identification 3260 from the quay container crane 2200 to the container inventory management system 1000 as shown in FIGS. 4B, 5 and 6A.

(5) At the container inventory management 1000 shown in FIGS. 4A to 5, compare the information contained in the received signals with the database 1100 to verify whether the container 100 is deposited at the proper address.

Various embodiments of the invention support some or all of the following:

The optical characteristic recognition system 3000 shown in FIGS. 4A to 5 and 14 reliably performs under all real-life environmental conditions including any or all of the following: weather, traffic load and power supply variations.

The optical characteristic recognition system 3000 shown in FIGS. 4A to 5 and 14 can read the representations of a container's code 110, determine the current location of container 100, and then wirelessly transmit this data back to the container inventory management system 1000 shown in FIGS. 4A to 5.

The optical characteristic recognition system 3000 shown in FIGS. 4A to 5 and 14 downloads and saves the optical characteristic and positional identification to an on-board buffer memory.

The optical characteristic recognition system 3000 shown in FIGS. 4A to 5 and 14 and/or the container inventory management system 1000 shown in FIGS. 4A to 5 warn the yard clerk if the actual location is different from that listed in the yard's container inventory database 1100, as shown in FIG. 4A.

The optical characteristic recognition system 3000 shown in FIGS. 4A to 5 and 14 and/or the container inventory management system 1000 shown in FIGS. 4A to 5 allow the yard clerk to conveniently change the database 1100 shown in FIG. 4A.

The preceding embodiments have been provided by way of example and are not meant to constrain the scope of the following claims.

What is claimed is:

1. An optical characteristic system providing container code recognition from a quay container crane of a container identified by a container code to a container inventory management system, comprising:

a computer communicatively coupled to at least two video imaging devices and controlled by a program system comprising program steps residing in a memory accessibly coupled to said computer;

said video imaging device is mechanically coupled to said quay container crane, for each of said video imaging devices;

wherein said program system is further comprised of the program steps of:

generating an optical characteristic of said container code based upon at least one of said video imaging devices;

generating a positional identification of said container; and sending said optical characteristic of said container code and said positional identification of said container to said container inventory management system;

wherein the program step generating said optical characteristic of said container code is comprised of at least one member of the collection comprising the program steps of:

acquiring at least one container code image of a container representation of said container code imaged from said video imaging device;

applying an optical character recognition process to said container code image to create an estimated container code;

acquiring a first container code image from said video imaging device of said container representation of said container code; and compressing said first container code image to create said container code image;

wherein each of said video imaging devices belongs to a collection comprising at least a video camera, a digital video camera, and a charged coupled array;

wherein the program step generating said positional identification of said container is further comprised of at least one member of the collection comprising the program steps of:

generating a loading-operation designation for said container;

generating a storage-location designation for said container; and generating a terminal location for said quay container crane;

wherein the program step generating said loading-operation is further comprised of at least one member of the collection comprising the program steps of:

receiving a locking indication from a programmable logic controller within said quay container crane; and determining said locking indication from a relay network within said quay container crane;

wherein the program step generating said loading-operation is further comprised of at least one member of the collection comprising the program steps of:

determining a container hoist position based upon sensing a gray-coded hoist shaft in said quay container crane; and determining said container hoist position based upon sensing an ultrasonic transponder; and wherein the program step generating said loading-operation is further comprised of the program step of:

generating said loading-operation designation based upon at least one member of the collection comprising said locking signal indication and said container hoist position;

wherein the program step sending said optical characteristic and said positional identification, is comprised of the program steps of:

sending a packet from a network to create a received packet; and creating said packet from at least part of at least one member of a sending-data collection;

wherein said sending-data collection is comprised of said optical characteristic of said container code and said positional identification of said container;

wherein said network employs at least one member of a physical transport collection in communicating from said quay container crane to container inventory management system;

wherein said physical transport collection is comprised of at least one wireline physical transport layer and at least one wireless physical transport layer.

2. The apparatus of claim 1, wherein the program step acquiring said container code image is further comprised of the at least one member of the collection comprising the program steps of:

selecting a first of at least two of said video imaging devices; and acquiring said container code image from said first video imaging device of said container representation of said container code.

3. The apparatus of claim 1, wherein the program step generating said optical characteristic of said container code is further comprised of the program step of:

processing said first container code image to create said container code image.

4. The apparatus of claim 3, further comprised of the program step of:

receiving a modified container code image request; and wherein the program step processing said first container code image is further comprised of the program step of:

processing said first container code image based upon said modified container code image request to create said container code image.

5. The apparatus of claim 1, wherein the program step generating said storage-location designation is further comprised the program step of:

deriving said storage-location designation for said container at least in part from said terminal location for said quay container crane;

wherein the program step generating said terminal location for said quay container crane is further comprised of the program step of:

receiving a location reading from a Global Positioning System (GPS) receiver to create at least in part said terminal location for said quay container crane;

wherein said GPS receiver is mechanically coupled with said quay container crane.

6. The apparatus of claim 1, wherein the program step sending said optical characteristic and said positional identification, is comprised of at least one member of the collection comprising the program steps of:

writing said optical characteristic of said container code and said positional identification of said container to a removable non-volatile memory;

writing at least one member of said sending-data collection to a file contained in said removable non-volatile memory; and writing at least one member of said sending-data collection to a record contained in said removable non-volatile memory.

7. A method providing container code recognition from a quay container crane of a container identified by a container code to a container inventory management system, comprising the steps of:

generating an optical characteristic of said container code based upon at least one video imaging device mechanically coupled to said quay container crane;

generating a positional identification of said container; and sending said optical characteristic of said container code and said positional identification of said container to said container inventory management system;

wherein the step generating said optical characteristic of said container code is comprised of the steps of:

acquiring at least one container code image of a container representation of said container code imaged from said video imaging device; and applying an optical character recognition process to said container code image to create an estimated container code;

acquiring a first container code image from said video imaging device of said container representation of said container code; and compressing said first container code image to create said container code image;

wherein said video imaging device belongs to a collection comprising at least a video camera, a digital video camera, and a charged coupled array;

wherein the step generating said positional identification of said container is further comprised of at least one member of the collection comprising the steps of:

generating a loading-operation designation for said container;

generating a storage-location designation for said container; and generating a terminal location for said quay container crane;

wherein the step generating said loading-operation is further comprised of at least one member of the collection comprising the steps of:

receiving a locking indication from a programmable logic controller within said quay container crane; and determining said locking indication from a relay network within said quay container crane;

wherein the step generating said loading-operation is further comprised of at least one member of the collection comprising the steps of:

determining a container hoist position based upon sensing a gray-coded hoist shaft in said quay container crane; and determining said container hoist position based upon sensing an ultrasonic transponder; and wherein the step generating said loading-operation is further comprised of the step of:

generating said loading-operation designation based upon at least one member of the collection comprising said locking signal indication and said container hoist position.

8. The method of claim 7, wherein the step acquiring said container code image is further comprised of the at least one member of the collection comprising the steps of:

selecting a first of at least two of said video imaging devices; and acquiring said container code image from said first video imaging device of said container representation of said container code.

9. The method of claim 7, wherein the step generating said optical characteristic of said container code is comprised of the step of:

processing said first container code image to create said container code image.

10. The method of claim 9, further comprised of the step of:

receiving a modified container code image request; and wherein the step processing said first container code image is further comprised of the step of:

processing said first container code image based upon said modified container code image request to create said container code image.

11. The method of claim 7, wherein the step generating said storage-location designation is further comprised the step of:

deriving said storage-location designation for said container at least in part from said terminal location for said quay container crane; and wherein the step generating said terminal location for said quay container crane is further comprised of the step of:

receiving a location reading from a Global Positioning System (GPS) receiver to create at least in part said terminal location for said quay container crane;

wherein said GPS receiver is mechanically coupled with said quay container crane.

12. The method of claim 7, wherein the step sending said optical characteristic and said positional identification, is comprised of the steps of:

sending a packet from a network to create a received packet; and creating said packet from at least part of at least one member of a sending-data collection;

wherein said sending-data collection is comprised of said optical characteristic of said container code and said positional identification of said container;

wherein said network employs at least one member of a physical transport collection in communicating from said quay container crane to container inventory management system;

wherein said physical transport collection is comprised of at least one wireline physical transport layer and at least one wireless physical transport layer.

13. The method of claim 12, wherein the step sending said optical characteristic and said positional identification, is comprised of at least one member of the collection comprising the steps of:

writing said optical characteristic of said container code and said positional identification of said container to a removable non-volatile memory;

writing at least one member of said sending-data collection to a file contained in said removable non-volatile memory; and writing at least one member of said sending-data collection to a record contained in said removable non-volatile memory.

14. A program system implementing the method of claim 7 by controlling a computer through a collection of program steps implementing the steps of claim 7, wherein said program steps reside in a memory accessibly coupled with said computer.

15. A system implementing the method of claim 7, comprising a means implementing each of the steps of claim 7.

16. The system of claim 15, wherein at least one of said means of claim 15 is comprised of at least one member of the collection comprising: an instruction processor, an inferential processor, a finite state machine, and a memory;

wherein said instruction processor includes at least one member of the collection comprising: a Single Instruction Single Datapath (SISD) processor, a Single Instruction Multiple Datapath (SIMD) processor, a Multiple Instruction Single Datapath (MISD) processor, a Multiple Instruction Multiple Datapath (MIMD) processor, a Complex Instruction Set Computer (CISC), a Reduced Instruction Set Computer (RISC) and a Very Long Instruction Word (VLIW) computer;

wherein said inferential processor includes at least one member of the collection comprising: a rule-based inferential processor, a constraint-based inferential processor, and a fuzzy logic engine;

wherein said finite state machine includes at least one member of the collection comprising: at least part of a programmable logic device, at least part of an application specific integrated circuit;

wherein said programmable logic device includes at least one member of the collection comprising: a Field Programmable Gate Array (FPGA), a Programmable Logic Device (PLD), a Complex Programmable Logic Device (CPLD);

wherein said memory includes at least one member of the collection comprising: a volatile memory and a non-volatile memory;

wherein said non-volatile memory includes at least one member of the collection comprising: a writeable non-volatile memory and a Read Only Memory (ROM);

wherein said writeable non-volatile memory includes at least one member of the collection comprising: an electro-magnetically interfaced non-volatile memory and an optically interfaced non-volatile memory.

17. An optical characteristic system providing container code recognition from a quay container crane of a container identified by a container code to a container inventory management system, comprising:

a computer communicatively coupled to at least one video imaging device and controlled by a program system comprising program steps residing in a memory accessibly coupled to said computer;

said video imaging device is mechanically coupled to said quay container crane, for each of said video imaging devices;

wherein said program system is further comprised of the program steps of:
  generating an optical characteristic of said container code based upon at least one of said video imaging devices;
  generating a positional identification of said container; and
  sending said optical characteristic of said container code and said positional identification of said container to said container inventory management system;

wherein the program step generating said optical characteristic of said container code is comprised of at least one member of the collection comprising the program steps of:
  acquiring at least one container code image of a container representation of said container code imaged from said video imaging device;
  applying an optical character recognition process to said container code image to create an estimated container code;
  acquiring a first container code image from said video imaging device of said container representation of said container code; and
  compressing said first container code image to create said container code image;

wherein said video imaging device belongs to a collection comprising at least a video camera, a digital video camera, and a charged coupled array;

wherein the program step generating said positional identification of said container is further comprised of at least one member of the collection comprising the program steps of:
  generating a loading-operation designation for said container;
  generating a storage-location designation for said container; and
  generating a terminal location for said quay container crane;

wherein the program step generating said loading-operation is further comprised of at least one member of the collection comprising the program steps of:
  receiving a locking indication from a programmable logic controller within said quay container crane; and
  determining said locking indication from a relay network within said quay container crane;

wherein the program step generating said loading-operation is further comprised of at least one member of the collection comprising the program steps of:
  determining a container hoist position based upon sensing a gray-coded hoist shaft in said quay container crane; and
  determining said container hoist position based upon sensing an ultrasonic transponder; and wherein the program step generating said loading-operation is further comprised of the program step of:
  generating said loading-operation designation based upon at least one member of the collection comprising said locking signal indication and said container hoist position.

18. The apparatus of claim 17,
wherein the program step acquiring said container code image is further comprised of the at least one member of the collection comprising the program steps of:
  selecting a first of at least two of said video imaging devices; and
  acquiring said container code image from said first video imaging device of said container representation of said container code.

19. The apparatus of claim 17,
wherein the program step generating said optical characteristic of said container code is further comprised of the program step of:
  processing said first container code image to create said container code image.

20. The apparatus of claim 19, further comprised of the program step of:
  receiving a modified container code image request; and
  wherein the program step processing said first container code image is further comprised of the program step of:
    processing said first container code image based upon said modified container code image request to create said container code image.

21. The apparatus of claim 17,
wherein the program step generating said storage-location designation is further comprised the program step of:
  deriving said storage-location designation for said container at least in part from said terminal location for said quay container crane;
wherein the program step generating said terminal location for said quay container crane is further comprised of the program step of:
  receiving a location reading from a Global Positioning System (GPS) receiver to create at least in part said terminal location for said quay container crane;
wherein said GPS receiver is mechanically coupled with said quay container crane.

22. The apparatus of claim 17,
wherein the program step sending said optical characteristic and said positional identification, is comprised of the program steps of:
  sending a packet from a network to create a received packet; and
  creating said packet from at least part of at least one member of a sending-data collection;
wherein said sending-data collection is comprised of said optical characteristic of said container code and said positional identification of said container;
wherein said network employs at least one member of a physical transport collection in communicating from said quay container crane to container inventory management system;
wherein said physical transport collection is comprised of at least one wireline physical transport layer and at least one wireless physical transport layer.

23. The apparatus of claim 22,
wherein the program step sending said optical characteristic and said positional identification, is comprised of at least one member of the collection comprising the program steps of:
  writing said optical characteristic of said container code and said positional identification of said container to a removable non-volatile memory;
  writing at least one member of said sending-data collection to a file contained in said removable non-volatile memory; and writing at least one member of said sending-data collection to a record contained in said removable non-volatile memory.

24. A method providing container code recognition from a quay container crane of a container identified by a container code to a container inventory management system, comprising the steps of:

generating an optical characteristic of said container code based upon at least two video imaging devices mechanically coupled to said quay container crane;

generating a positional identification of said container; and sending said optical characteristic of said container code and said positional identification of said container to said container inventory management system;

wherein the step generating said optical characteristic of said container code is comprised of the steps of:

acquiring at least one container code image of a container representation of said container code imaged from said video imaging device; and applying an optical character recognition process to said container code image to create an estimated container code;

acquiring a first container code image from said video imaging device of said container representation of said container code; and compressing said first container code image to create said container code image;

wherein each of said video imaging devices belongs to a collection comprising at least a video camera, a digital video camera, and a charged coupled array;

wherein the step generating said positional identification of said container is further comprised of at least one member of the collection comprising the steps of:

generating a loading-operation designation for said container;

generating a storage-location designation for said container; and generating a terminal location for said quay container crane;

wherein the step generating said loading-operation is further comprised of at least one member of the collection comprising the steps of:

receiving a locking indication from a programmable logic controller within said quay container crane; and determining said locking indication from a relay network within said quay container crane;

wherein the step generating said loading-operation is further comprised of at least one member of the collection comprising the steps of:

determining a container hoist position based upon sensing a gray-coded hoist shaft in said quay container crane; and determining said container hoist position based upon sensing an ultrasonic transponder; and wherein the step generating said loading-operation is further comprised of the step of:

generating said loading-operation designation based upon at least one member of the collection comprising said locking signal indication and said container hoist position;

wherein the step sending said optical characteristic and said positional identification, is comprised of the steps of:

sending a packet from a network to create a received packet; and creating said packet from at least part of at least one member of a sending-data collection;

wherein said sending-data collection is comprised of said optical characteristic of said container code and said positional identification of said container;

wherein said network employs at least one member of a physical transport collection in communicating from said quay container crane to container inventory management system;

wherein said physical transport collection is comprised of at least one wireline physical transport layer and at least one wireless physical transport layer.

25. The method of claim 24, further comprising the step of:

receiving a modified container code image request; and wherein the step acquiring said container code image is further comprised of the at least one member of the collection comprising the steps of:

selecting a first of at least two of said video imaging devices; and acquiring said container code image from said first video imaging device of said container representation of said container code;

wherein the step generating said optical characteristic of said container code is comprised of the step of:

processing said first container code image to create said container code image; and wherein the step processing said first container code image is comprised of the step of:

processing said first container code image based upon said modified container code image request to create said container code image.

26. The method of claim 24, wherein the step generating said storage-location designation is further comprised the step of:

deriving said storage-location designation for said container at least in part from said terminal location for said quay container crane; and wherein the step generating said terminal location for said quay container crane is further comprised of the step of:

receiving a location reading from a Global Positioning System (GPS) receiver to create at least in part said terminal location for said quay container crane;

wherein said GPS receiver is mechanically coupled with said quay container crane.

27. The method of claim 24, wherein the step sending said optical characteristic and said positional identification, is comprised of at least one member of the collection comprising the steps of:

writing said optical characteristic of said container code and said positional identification of said container to a removable non-volatile memory;

writing at least one member of said sending-data collection to a file contained in said removable non-volatile memory; and writing at least one member of said sending-data collection to a record contained in said removable non-volatile memory.

28. A program system implementing the method of claim 24 by controlling a computer through a collection of program steps implementing the steps of claim 24, wherein said program steps reside in a memory accessibly coupled with said computer.

29. A system implementing the method of claim 24, comprising a means implementing each of the steps of claim 24.

30. The system of claim 29,
  wherein at least one of said means of claim 29 is comprised of at least one member of the collection comprising: an instruction processor, an inferential processor, a finite state machine, and a memory;
  wherein said instruction processor includes at least one member of the collection comprising: a Single Instruction Single Datapath (SISD) processor, a Single Instruction Multiple Datapath (SIMD) processor, a Multiple Instruction Single Datapath (MISD) processor, a Multiple Instruction Multiple Datapath (MIMD) processor, a Complex Instruction Set Computer (CISC), a Reduced Instruction Set Computer (RISC) and a Very Long Instruction Word (VLIW) computer;
  wherein said inferential processor includes at least one member of the collection comprising: a rule-based inferential processor, a constraint-based inferential processor, and a fuzzy logic engine;
  wherein said finite state machine includes at least one member of the collection comprising: at least part of a programmable logic device, at least part of an application specific integrated circuit;
  wherein said programmable logic device includes at least one member of the collection comprising: a Field Programmable Gate Array (FPGA), a Programmable Logic Device (PLD), a Complex Programmable Logic Device (CPLD);
  wherein said memory includes at least one member of the collection comprising: a volatile memory and a non-volatile memory;
  wherein said non-volatile memory includes at least one member of the collection comprising: a writeable non-volatile memory and a Read Only Memory (ROM);
  wherein said writeable non-volatile memory includes at least one member of the collection comprising: an electro-magnetically interfaced non-volatile memory and an optically interfaced non-volatile memory.

31. A method providing container code recognition from a quay container crane of a container identified by a container code to a container inventory management system, comprising the steps of:
  generating an optical characteristic of said container code based upon at least one video imaging device mechanically coupled to said quay container crane;
  generating a positional identification of said container; and
  sending said optical characteristic of said container code and said positional identification of said container to said container inventory management system;
  wherein the step generating said optical characteristic of said container code is comprised of the steps of:
    acquiring at least one container code image of a container representation of said container code imaged from said video imaging device; and
    applying an optical character recognition process to said container code image to create an estimated container code;
    acquiring a first container code image from said video imaging device of said container representation of said container code; and
    compressing said first container code image to create said container code image;
  wherein said video imaging device belongs to a collection comprising at least a video camera, a digital video camera, and a charged coupled array.

32. The method of claim 31,
  wherein the step acquiring said container code image is further comprised of the at least one member of the collection comprising the steps of:
    selecting a first of at least two of said video imaging devices; and
    acquiring said container code image from said first video imaging device of said container representation of said container code.

33. The method of claim 31,
  wherein the step generating said optical characteristic of said container code is comprised of the step of:
    processing said first container code image to create said container code image.

34. The method of claim 33, further comprised of the step of:
  receiving a modified container code image request; and
  wherein the step processing said first container code image is further comprised of the step of:
    processing said first container code image based upon said modified container code image request to create said container code image.

35. The method of claim 31,
  wherein the step generating said positional identification of said container is further comprised of at least one member of the collection comprising the steps of:
    generating a loading-operation designation for said container;
    generating a storage-location designation for said container; and
    generating a terminal location for said quay container crane.

36. A method providing container code recognition from a quay container crane of a container identified by a container code to a container inventory management system, comprising the steps of:
  generating an optical characteristic of said container code based upon at least one video imaging device mechanically coupled to said quay container crane;
  generating a positional identification of said container; and
  sending said optical characteristic of said container code and said positional identification of said container to said container inventory management system;
  wherein the step generating said positional identification of said container is further comprised of at least one member of the collection comprising the steps of:
    generating a loading-operation designation for said container;
    generating a storage-location designation for said container; and
    generating a terminal location for said quay container crane;
  wherein the step generating said loading-operation is further comprised of at least one member of the collection comprising the steps of:
    receiving a locking indication from a programmable logic controller within said quay container crane; and
    determining said locking indication from a relay network within said quay container crane;
  wherein the step generating said loading-operation is further comprised of at least one member of the collection comprising the steps of:
    determining a container hoist position based upon sensing a gray-coded hoist shaft in said quay container crane; and determining said container hoist position based upon sensing an ultrasonic transponder; and wherein the step generating said loading-operation is further comprised of the step of:
generating said loading-operation designation based upon at least one member of the collection comprising said locking signal indication and said container hoist position.

37. The method of claim 36,
wherein the step generating said storage-location designation is further comprised the step of:
deriving said storage-location designation for said container at least in part from said terminal location for said quay container crane; and wherein the step generating said terminal location for said quay container crane is further comprised of the step of:
receiving a location reading from a Global Positioning System (GPS) receiver to create at least in part said terminal location for said quay container crane;

wherein said GPS receiver is mechanically coupled with said quay container crane.

38. The method of claim 36,
wherein the step sending said optical characteristic and said positional identification, is comprised of the steps of:
sending a packet from a network to create a received packet; and
creating said packet from at least part of at least one member of a sending-data collection;

wherein said sending-data collection is comprised of said optical characteristic of said container code and said positional identification of said container;

wherein said network employs at least one member of a physical transport collection in communicating from said quay container crane to container inventory management system;

wherein said physical transport collection is comprised of at least one wireline physical transport layer and at least one wireless physical transport layer.

39. The method of claim 38,
wherein the step sending said optical characteristic and said positional identification, is comprised of at least one member of the collection comprising the steps of:
writing said optical characteristic of said container code and said positional identification of said container to a removable non-volatile memory;
writing at least one member of said sending-data collection to a file contained in said removable non-volatile memory; and
writing at least one member of said sending-data collection to a record contained in said removable non-volatile memory.

40. A program system implementing the method of claim 36 by controlling a computer through a collection of program steps implementing the steps of claim 36,
wherein said program steps reside in a memory accessibly coupled with said computer.

41. A system implementing the method of claim 36, comprising a means implementing each of the steps of claim 36.

42. The system of claim 41,
wherein at least one of said means of claim 41 is comprised of at least one member of the collection comprising: an instruction processor, an inferential processor, a finite state machine, and a memory;

wherein said instruction processor includes at least one member of the collection comprising: a Single Instruction Single Datapath (SISD) processor, a Single Instruction Multiple Datapath (SIMD) processor, a Multiple Instruction Single Datapath (MISD) processor, a Multiple Instruction Multiple Datapath (MIMD) processor, a Complex Instruction Set Computer (CISC), a Reduced Instruction Set Computer (RISC) and a Very Long Instruction Word (VLIW) computer;

wherein said inferential processor includes at least one member of the collection comprising: a rule-based inferential processor, a constraint-based inferential processor, and a fuzzy logic engine;

wherein said finite state machine includes at least one member of the collection comprising: at least part of a programmable logic device, at least part of an application specific integrated circuit;

wherein said programmable logic device includes at least one member of the collection comprising: a Field Programmable Gate Array (FPGA), a Programmable Logic Array (PLA), a Complex Programmable Logic Array (CPLA);

wherein said memory includes at least one member of the collection comprising: a volatile memory and a non-volatile memory;

wherein said non-volatile memory includes at least one member of the collection comprising: a writeable non-volatile memory and a Read Only Memory (ROM);

wherein said writeable non-volatile memory includes at least one member of the collection comprising: an electro-magnetically interfaced non-volatile memory and an optically interfaced non-volatile memory.

43. An optical characteristic system providing container code recognition from a quay container crane of a container identified by a container code to a container inventory management system, comprising:
a computer communicatively coupled to at least one video imaging device and controlled by a program system comprising program steps residing in a memory accessibly coupled to said computer;
said video imaging device is mechanically coupled to said quay container crane, for each of said video imaging devices;

wherein said program system is further comprised of the program steps of:
generating an optical characteristic of said container code based upon at least one of said video imaging devices;
generating a positional identification of said container; and
sending said optical characteristic of said container code and said positional identification of said container to said container inventory management system;

wherein the program step generating said optical characteristic of said container code is comprised of at least one member of the collection comprising the program steps of:
acquiring at least one container code image of a container representation of said container code imaged from said video imaging device;
applying an optical character recognition process to said container code image to create an estimated container code;

acquiring a first container code image from said video imaging device of said container representation of said container code; and processing said first container code image to create said container code image;

wherein said video imaging device belongs to a collection comprising at least a video camera, a digital video camera, and a charged coupled array.

44. The apparatus of claim 43, wherein the program step acquiring said container code image is further comprised of the at least one member of the collection comprising the program steps of:

selecting a first of at least two of said video imaging devices; and acquiring said container code image from said first video imaging device of said container representation of said container code.

45. The apparatus of claim 43, wherein the program step generating said optical characteristic of said container code is further comprised of the program step of:

compressing said first container code image to create said container code image.

46. The apparatus of claim 45, further comprised of the program step of:

receiving a modified container code image request; and wherein the program step processing said first container code image is further comprised of the program step of:

processing said first container code image based upon said modified container code image request to create said container code image.

47. The apparatus of claim 43, wherein the program step generating said positional identification of said container is further comprised of at least one member of the collection comprising the program steps of:

generating a loading-operation designation for said container;

generating a storage-location designation for said container; and generating a terminal location for said quay container crane.

48. An optical characteristic system providing container code recognition from a quay container crane of a container identified by a container code to a container inventory management system, comprising:

a computer communicatively coupled to at least one video imaging device and controlled by a program system comprising program steps residing in a memory accessibly coupled to said computer;

said video imaging device is mechanically coupled to said quay container crane, for each of said video imaging devices;

wherein said program system is further comprised of the program steps of:

generating an optical characteristic of said container code based upon at least one of said video imaging devices;

generating a positional identification of said container; and sending said optical characteristic of said container code and said positional identification of said container to said container inventory management system;

wherein the program step generating said positional identification of said container is further comprised of at least one member of the collection comprising the program steps of:

generating a loading-operation designation for said container;

generating a storage-location designation for said container; and generating a terminal location for said quay container crane;

wherein the program step generating said loading-operation is further comprised of at least one member of the collection comprising the program steps of:

receiving a locking indication from a programmable logic controller within said quay container crane; and determining said locking indication from a relay network within said quay container crane;

wherein the program step generating said loading-operation is further comprised of at least one member of the collection comprising the program steps of:

determining a container hoist position based upon sensing a gray-coded hoist shaft in said quay container crane; and determining said container hoist position based upon sensing an ultrasonic transponder; and wherein the program step generating said loading-operation is further comprised of the program step of:

generating said loading-operation designation based upon at least one member of the collection comprising said locking signal indication and said container hoist position.

49. The apparatus of claim 48, wherein the program step generating said storage-location designation is further comprised the program step of:

deriving said storage-location designation for said container at least in part from said terminal location for said quay container crane;

wherein the program step generating said terminal location for said quay container crane is further comprised of the program step of:

receiving a location reading from a Global Positioning System (GPS) receiver to create at least in part said terminal location for said quay container crane;

wherein said GPS receiver is mechanically coupled with said quay container crane.

50. The apparatus of claim 48, wherein the program step sending said optical characteristic and said positional identification, is comprised of the program steps of:

sending a packet from a network to create a received packet; and creating said packet from at least part of at least one member of a sending-data collection;

wherein said sending-data collection is comprised of said optical characteristic of said container code and said positional identification of said container;

wherein said network employs at least one member of a physical transport collection in communicating from said quay container crane to container inventory management system;

wherein said physical transport collection is comprised of at least one wireline physical transport layer and at least one wireless physical transport layer.

51. The apparatus of claim 50, wherein the program step sending said optical characteristic and said positional identification, is comprised of at least one member of the collection comprising the program steps of:

writing said optical characteristic of said container code and said positional identification of said container to a removable non-volatile memory;
writing at least one member of said sending-data collection to a file contained in said removable non-volatile memory; and
writing at least one member of said sending-data collection to a record contained in said removable non-volatile memory.

52. The method of claim 31,
wherein the step sending said optical characteristic and said positional identification, is comprised of the steps of:
sending a packet from a network to create a received packet; and
creating said packet from at least part of at least one member of a sending-data collection;
wherein said sending-data collection is comprised of said optical characteristic of said container code and said positional identification of said container;
wherein said network employs at least one member of a physical transport collection in communicating from said quay container crane to container inventory management system;
wherein said physical transport collection is comprised of at least one wireline physical transport layer and at least one wireless physical transport layer.

53. The method of claim 52,
wherein the step sending said optical characteristic and said positional identification, is comprised of at least one member of the collection comprising the steps of:
writing said optical characteristic of said container code and said positional identification of said container to a removable non-volatile memory;
writing at least one member of said sending-data collection to a file contained in said removable non-volatile memory; and
writing at least one member of said sending-data collection to a record contained in said removable non-volatile memory.

54. A program system implementing the method of claim 31 controlling a computer through a collection of program steps implementing the steps of claim 31,
wherein said program steps reside in a memory accessibly coupled with said computer.

55. A system implementing the method of claim 31, comprising a means implementing each of the steps of claim 31.

56. The system of claim 55,
wherein at least one of said means of claim 55 is comprised of at least one member of the collection comprising: an instruction processor, an inferential processor, a finite state machine, and a memory;
wherein said instruction processor includes at least one member of the collection comprising: a Single Instruction Single Datapath (SISD) processor, a Single Instruction Multiple Datapath (SIMD) processor, a Multiple Instruction Single Datapath (MISD) processor, a Multiple Instruction Multiple Datapath (MIMD) processor, a Complex Instruction Set Computer (CISC), a Reduced Instruction Set Computer (RISC) and a Very Long Instruction Word (VLIW) computer;
wherein said inferential processor includes at least one member of the collection comprising: a rule-based inferential processor, a constraint-based inferential processor, and a fuzzy logic engine;
wherein said finite state machine includes at least one member of the collection comprising: at least part of a programmable logic device, at least part of an application specific integrated circuit;
wherein said programmable logic device includes at least one member of the collection comprising: a Field Programmable Gate Array (FPGA), a Programmable Logic Array (PLA), a Complex Programmable Logic Array (CPLA);
wherein said memory includes at least one member of the collection comprising: a volatile memory and a non-volatile memory;
wherein said non-volatile memory includes at least one member of the collection comprising: a writeable non-volatile memory and a Read Only Memory (ROM);
wherein said writeable non-volatile memory includes at least one member of the collection comprising: an electro-magnetically interfaced non-volatile memory and an optically interfaced non-volatile memory.

57. The apparatus of claim 47,
wherein the program step generating said loading-operation is further comprised of at least one member of the collection comprising the program steps of:
receiving a locking indication from a programmable logic controller within said quay container crane; and
determining said locking indication from a relay network within said quay container crane;
wherein the program step generating said loading-operation is further comprised of at least one member of the collection comprising the program steps of:
determining a container hoist position based upon sensing a gray-coded hoist shaft in said quay container crane; and
determining said container hoist position based upon sensing an ultrasonic transponder; and
wherein the program step generating said loading-operation is further comprised of the program step of:
generating said loading-operation designation based upon at least one member of the collection comprising said locking signal indication and said container hoist position.

58. The apparatus of claim 57,
wherein the program step generating said storage-location designation is further comprised the program step of:
deriving said storage-location designation for said container at least in part from said terminal location for said quay container crane;
wherein the program step generating said terminal location for said quay container crane is further comprised of the program step of:
receiving a location reading from a Global Positioning System (GPS) receiver to create at least in part said terminal location for said quay container crane;
wherein said GPS receiver is mechanically coupled with said quay container crane.

59. The apparatus of claim 57,
wherein the program step sending said optical characteristic and said positional identification, is comprised of the program steps of:
sending a packet from a network to create a received packet; and
creating said packet from at least part of at least one member of a sending-data collection;
wherein said sending-data collection is comprised of said optical characteristic of said container code and said positional identification of said container;

wherein said network employs at least one member of a physical transport collection in communicating from said quay container crane to container inventory management system;

wherein said physical transport collection is comprised of at least one wireline physical transport layer and at least one wireless physical transport layer.

60. The apparatus of claim 59, wherein the program step sending said optical characteristic and said positional identification, is comprised of at least one member of the collection comprising the program steps of:

writing said optical characteristic of said container code and said positional identification of said container to a removable non-volatile memory;

writing at least one member of said sending-data collection to a file contained in said removable non-volatile memory; and writing at least one member of said sending-data collection to a record contained in said removable non-volatile memory.

\* \* \* \* \*

UNITED STATES PATENT AND TRADEMARK OFFICE
CERTIFICATE OF CORRECTION

PATENT NO. : 6,768,931 B2
DATED : July 27, 2004
INVENTOR(S) : Takehara et al.

It is certified that error appears in the above-identified patent and that said Letters Patent is hereby corrected as shown below:

<u>Title page,</u>
Item [63], Related U.S. Application Data, please change filing date "Aug. 4, 2002" to -- Aug. 4, 2000 --.

Signed and Sealed this

Twenty-sixth Day of October, 2004

JON W. DUDAS
*Director of the United States Patent and Trademark Office*